United States Patent [19]

Yoshimura et al.

[11] Patent Number: 5,416,591
[45] Date of Patent: May 16, 1995

[54] METHOD OF DETERMINATION OF A THREE-DIMENSIONAL PROFILE OF AN OBJECT

[75] Inventors: Kazunari Yoshimura; Kuninori Nakamura, both of Hirakata, Japan

[73] Assignee: Matsushita Electric Works, Ltd., Osaka, Japan

[21] Appl. No.: 79,595

[22] Filed: Jun. 22, 1993

[30] Foreign Application Priority Data

Jun. 25, 1992 [JP] Japan .................................. 4-167889

[51] Int. Cl.⁶ ...................... G01B 11/24; G01B 11/28; G01B 11/02
[52] U.S. Cl. .................................... 356/376; 356/380; 356/387; 250/332; 250/334
[58] Field of Search ............... 356/372, 376, 380, 386, 356/387; 250/332, 334

[56] References Cited

U.S. PATENT DOCUMENTS

| | | | |
|---|---|---|---|
| 4,627,734 | 12/1986 | Rioux | 356/376 |
| 5,102,226 | 4/1992 | Yoshimura et al. | 356/376 |
| 5,146,293 | 9/1992 | Mercer et al. | 356/376 |
| 5,196,900 | 3/1993 | Pettersen | 356/376 |
| 5,319,445 | 6/1974 | Fitts | 356/376 |

FOREIGN PATENT DOCUMENTS 4-7806 2/1992 Japan .

Primary Examiner—Rolf Hille
Assistant Examiner—David Ostrowski
Attorney, Agent, or Firm—Nikaido, Marmelstein, Murray & Oram

[57] ABSTRACT

A light beam is emitted to a target point on a target, so that the reflected light beam from the target point forms an illumination spot on a array sensor. The array sensor comprises a plurality of light receiving elements. The receiving elements are divided into a plurality of repeating units consisting of the same number of the receiving elements. The receiving elements in each of the repeating units are assigned respectively to different indexes. The receiving elements having the same index are commonly coupled so as to provide a single output indicative of the same index when the reflected light beam hits any one of the receiving elements. A method for determination of a three-dimensional profile of an object includes a first step of detecting a series of reference spots on the array sensor with respect to individual points obtained by scanning the light beam on a reference surface, and defining detection ranges respectively with respect to the individual reference spots, and a second step of detecting within the detection ranges a series of object spots obtained by scanning the light beam on an object surface and analyzing a positional deviation between the object spot and the corresponding reference spot within each of the detection range to determine the three-dimensional profile of the object in accordance with thus obtained positional deviations.

16 Claims, 22 Drawing Sheets

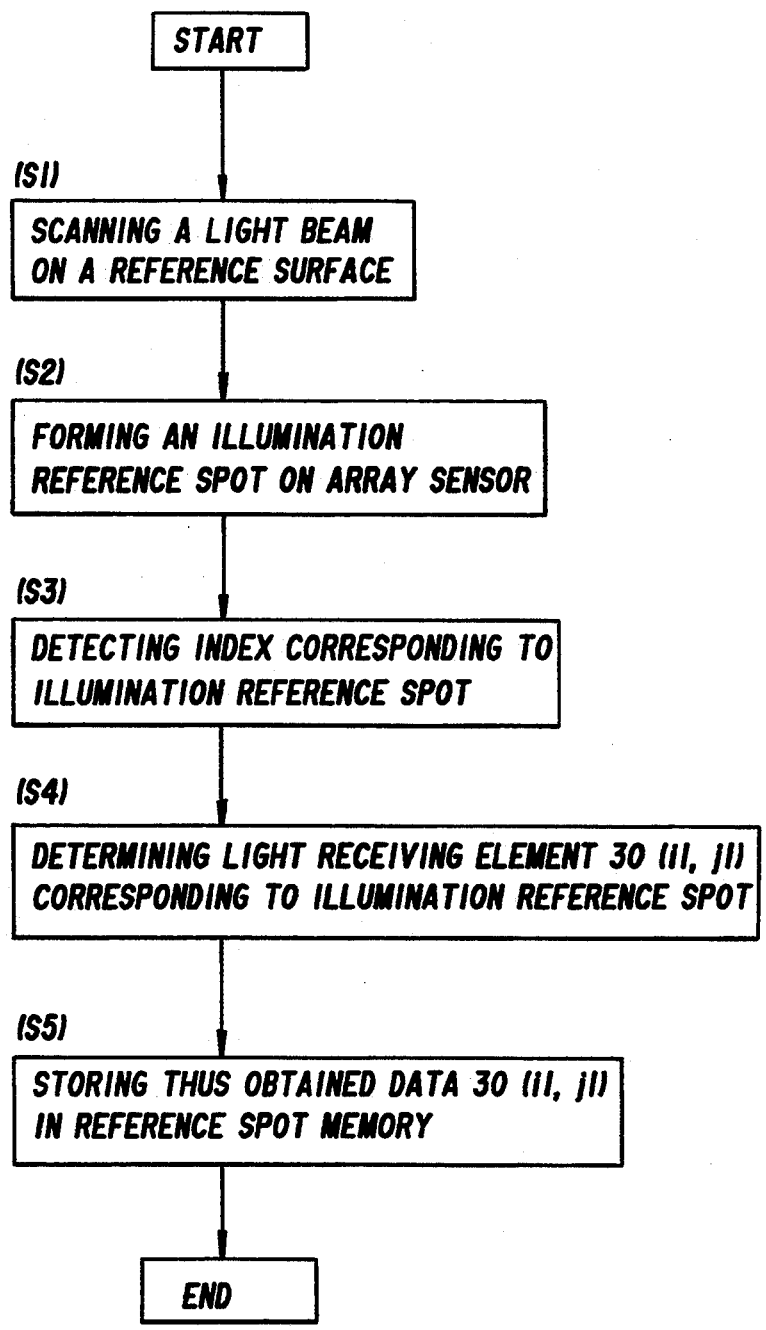

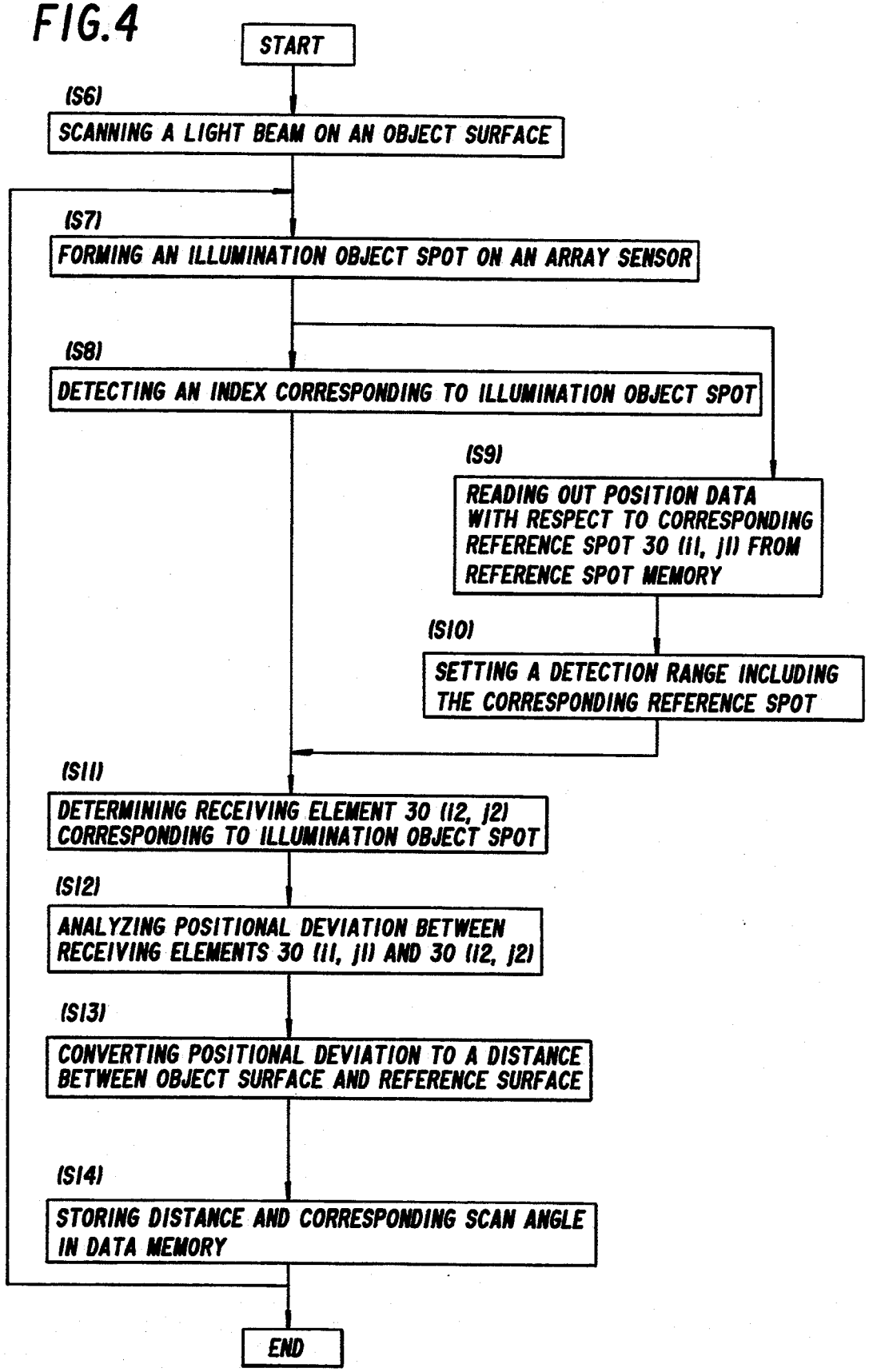

METHOD OF DETERMINATION OF A THREE-DIMENSIONAL PROFILE OF AN OBJECT

BACKGROUND OF THE INVENTION

1. Field of the Invention

The present invention is directed to a method of determination of a three-dimensional profile of an object in accordance with the concept of triangulation, and a device for determining the same.

2. Description of the Prior Art

In the past, a device for determining a three-dimensional profile of an object surface is utilized in inspection systems or industrial robots, etc. For example, Japanese Patent Publication [KOKOKU] 4-7806 presents an optical measurement system. As shown in FIG. 23, the system includes a light projecting device 2L for simultaneously emitting light beams to an object surface 1L to obtain a plurality of light spots LS on the object surface 1L, a video camera 3L spaced by a distance from the projecting device 2L for monitoring the light spots LS, and a computer (not shown) for operating positional data provided from the video camera 3L. In the prior art, when one of the light beams forms a light spot on the object surface, the light spot is monitored to form an object spot on a screen of the video camera 3L. On the other hand, when the same light beam forms an imaginal light spot on an imaginal surface spaced by the already known distance from the video camera 3L, a reference spot corresponding to the imaginal light spot is also formed on the screen of the video camera 3L. By analyzing a positional deviation between the object spot and the reference spot, a positional data of the object surface is obtained. The three-dimensional profile of the object is determined by collecting the positional data with respect to all light spots simultaneously projected on the object surface.

However, if some light spots are formed on a view line extending between the video camera 3L and a point on the 10 object surface, there is a problem that it is very difficult to distinguish one of the light spots from the another light spots, so that the three-dimensional profile of the object is not accurately obtained. Moreover, since this prior measurement system uses the video camera, there has a technical difficulty of detecting positional data from a wide surface area of the object.

On the other hand, U.S. Pat. No. 5,102,226 discloses a position detector utilized in an optical measurement system for determination of an object profile. As shown in FIG. 24, the position detector has a number of light receiving elements $40M_0$ to $40M_7$ arranged in two linear arrays 20M consisting of first and second arrays 21M and 22M extending in the direction of following a reflected light beam from the object surface as a scan angle of a light beam varies. In addition, each array is divided into eight subdivisions. That is, the receiving elements $40M_0$ to $40M_7$ in the first array 21M are designated by eight numerals "0" to "7", wherein one subdivision of the first array 21M consists of eight receiving elements with the same numeral, but has different numeral from another subdivisions. On the other hand, the receiving elements $40M_0$ to $40M_7$ in the second array 22M are grouped in such a manner that each subdivision consists of the receiving elements with eight different numerals "0" to "7". For instance, when the reflected light beam is focused on the linear arrays to form the beam spot LS at the illustrated position in FIG. 23, a coded signal "56" is issued as a result of that one of photo detectors $10M_0$ to $10M_7$ associated with the first array 21M through optical fibers 30M responds to provide a first output indicative of numeral "5" and one of photo detectors $11M_0$ to $11M_7$ associated with the second array 22M through the optical fibers 30M provides a second output indicative of numeral "6". The coded signal is stored as a positional data with respect to the object surface. The receiving elements of thus arranged arrays provides a resolution of 64 ($8 \times 8$) spots.

Accordingly, in case of determining the three-dimensional profile of the object with this prior system, as long as the light beam is scanned on a flat surface, the light beam reflected from the flat surface strikes the position detector at the same beam spot on the first and second arrays. When the light beam is scanned onto a convex or concave surface of the object which provides a positional deviation in a direction perpendicular to the flat surface, the light beam reflected from the object surface strikes the position detector at a different position from the beam spot obtained with respect to the flat surface. By detecting the beam spots with respect to individual points obtained by scanning the light beam onto the object surface, the three-dimensional profile of the object is accurately determined.

However, in this prior art, since it is required that a oscillating mirror for redirecting the reflected light beam from the object to the position detector is oscillated in synchronism with the other oscillating mirror for scanning the light beam on the object surface, such an optical measurement system creates difficulties because of necessary complex mirror synchronizing means and its expensive cost.

Moreover, when a plural number of the position detectors are used to obtain positional data from the wide surface area of the object, there has also problem of increasing the expensive photo detectors $10M_0$ to $10M_7$ and $11M_0$ to $11M_7$.

SUMMARY OF THE INVENTION

Therefore, a primary object of the present invention is to provide a method of determining a three-dimensional profile of an object while improving the above problems in the prior art. The method utilizes a light source for emitting a light beam onto a target surface and an array sensor, which is spaced by a distance from the light source, for receiving the reflected light beam from the target surface. In addition, the array sensor is disposed so that the reflected light beam moves in the direction of the array sensor as the scan angle of the light beam varies. The array sensor comprises a plurality of light receiving elements arranged in a row extending in the direction of moving the reflected light beam. The light receiving elements are divided into a plurality of repeating units consisting of the same number of the light receiving elements. The light receiving elements in each repeating units are assigned respectively to different row indexes. The light receiving elements having the same row index are commonly coupled to a photo detector to provide a single row output indicative of the same index when the reflected light beam hits any one of the light receiving elements having the same row index.

In accordance with the method of the present invention including first and second steps, the three-dimensional profile of the object is obtained. In the first step, a reference light beam from the light source is directed onto a reference point on a reference surface so that the reflected light beam from the reference point forms on the array sensor a reference illumination area. The row index of the light receiving element corresponding to the reference illumination area is detected, and defined as a reference spot. The above proceeding in the first step is repeated with respect to individual reference points formed by scanning the light beam onto the reference surface to obtain on the array sensor a series of reference spots corresponding to the individual reference points. Each of the reference spots is related to specific one of the row indexes of the light receiving elements. In accordance with the series of reference spots, a series of detection ranges are defined within the array sensor in such a manner that each of the detection ranges includes the corresponding reference spot and extends over a limited number of the light receiving elements. The limited number is not more than the number of the receiving elements in one repeating unit.

In the second step, the reference light beam is directed to an object point on a surface of the object disposed on the reference surface, so that the reflected light from the object point forms on the array sensor an object illumination area. The row index of the light receiving element corresponding to the object illumination area is detected, and defined as an object spot, which falls within the detection range corresponding to the reference spot obtained by the reference light beam. A position of the object point relative to the reference surface is determined according to an analysis of a positional deviation between the object spot and the corresponding reference spot. The above proceeding in the second step is repeated with respect to individual object points formed by scanning the light beam onto the object surface to obtain a series of positions of the individual object points relative to the reference surface, so that the three-dimensional profile of the object is accurately determined.

In the method of the present invention, the detection range is capable of being shifted in opposite directions along the row of the array sensor depending upon a surface configuration of the object surface intended to be scanned, while keeping the corresponding reference spot in the detection range.

Though there has been a technical difficulty of detecting positional data from a wide surface area of the object in the prior art, in the method of the present invention, it is only requested that an optimum number of the light receiving elements is arranged in the array sensor for determining the three-dimensional profile with respect to the wide surface area of the object. Moreover, since the light receiving elements having the same index in the array sensor are commonly coupled to the photo detector, it is capable of efficiently using the expensive photo detector. The number of the photo detectors necessary for a preferred embodiment of the present invention is substantially equal to the number of the receiving elements included in one repeating unit.

In addition, since it is not necessary to use an expensive and complex synchronizing mirror device in the method of the present invention, the three-dimensional profile of the object is readily and accurately determined.

In another preferred embodiment of the present invention, the array sensors are arranged in plural rows in such a manner as to obtain a series of illumination areas spaced along the row of each array sensor when scanning the light beam in two mutually crossing directions over the target surface. Thus arranged array sensors are configured such that the light receiving elements designated by the same row index but belong to the different array sensors are coupled separately to provide different column outputs indicative of column positions of the array sensors.

A device for determination of the three-dimensional profile of the object in accordance with the method of the present invention comprises a scanner for scanning the light beam across the target surface, the array sensor spaced by a distance from the scanner for receiving the reflected light beam from the target surface through a focusing lens, a reference spot memory for storing the series of row indexes corresponding to the reference spots obtained in the first step, a detection range setting unit for defining within the array sensor the detection ranges respectively with respect to the individual reference spots, an object spot collecting unit for obtaining a series of row indexes corresponding to the object spots obtained in the second step, and a position analyzer for determining the positional deviation between the object spot and the corresponding reference spot based upon the row indexes obtained within each of the detection ranges and converting the positional deviation into a distance from the reference surface to each of the object points to provide the three-dimensional profile of the object.

Other features, objects and advantages of the present invention will become more apparent from the following description about the preferred embodiments taken with reference to the accompanying drawings.

BRIEF DESCRIPTION OF THE DRAWINGS

FIG. 3 is a flow chart showing a first stage of a method of determining a three-dimensional profile of an object of the present invention;

FIG. 4 is a flow chart showing a second stage of the method of present invention;

DETAILED DESCRIPTION OF THE PREFERRED EMBODIMENTS

Embodiments of a method of determination of a three-dimensional profile of an object of the present invention are explained below referring to the attached drawings. However, the present invention is not limited by the embodiments.

First Embodiment <FIGS. 1A to 11>

Figure 1A:
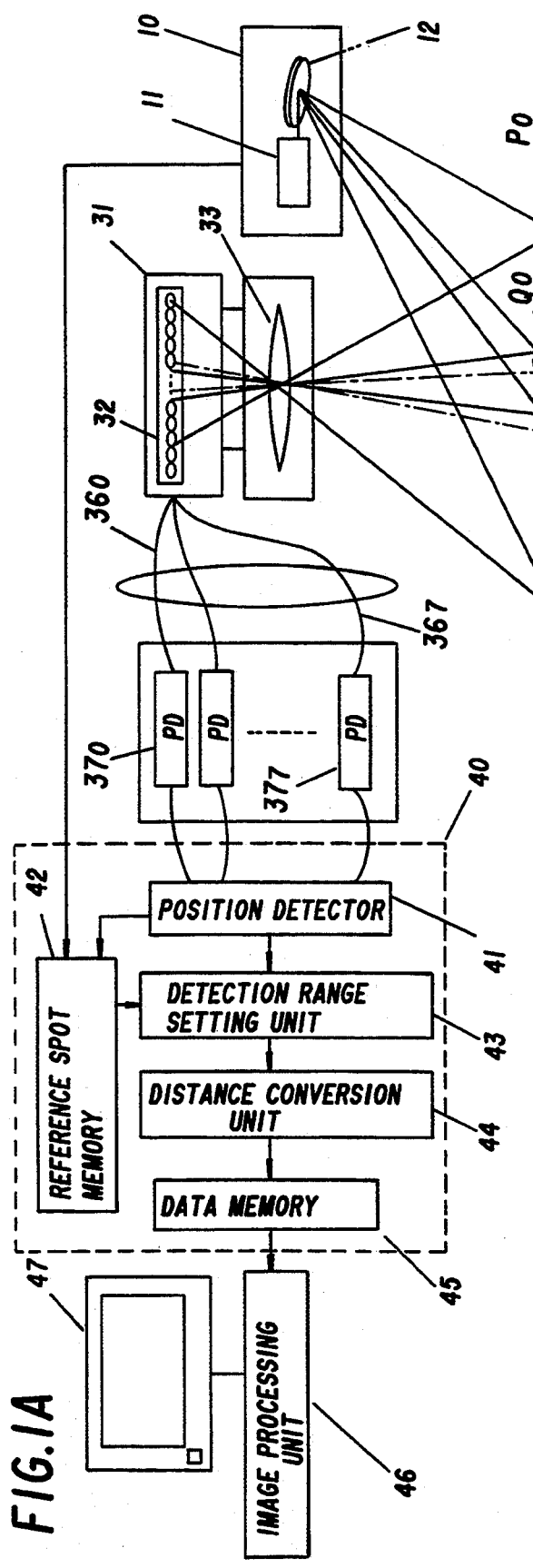
FIGS. 1A and 1B respectively show a diagrammatic front view of a device for determining a three-dimensional profile of an object according to a first embodiment of the present invention, and a schematic view illustrating a linear array sensor utilized in the first embodiment.
Figure 1B:
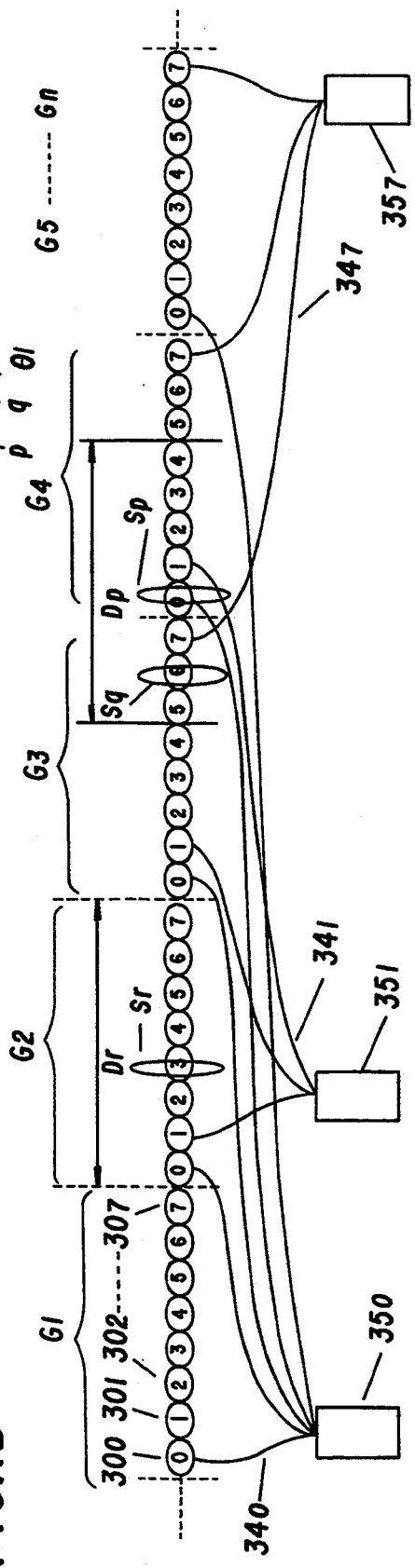

A device for determining the three-dimensional profile of the object of the present invention is illustrated in FIG. 1A. A scanner 10 including a light source 11 for emitting a light beam and a deflection mirror 12 for scanning the light beam across a target surface. A coherent light beam such as a laser is utilized as the light beam. The reflected light beam from a scanned point on the target surface is detected by a light receiving unit 31. The receiving unit 31 includes a linear array sensor 32 spaced by a fixed distance from the scanner 10 for receiving the reflected light beam, and a focusing lens 33 for focusing the reflected light beam on the array sensor 32 such that the reflected light beam hits any one of light receiving elements 300 to 307 arranged in the array sensor 32, as shown in FIG. 1B. The light receiving elements $30_0$ to $30_7$, each of which is defined as its one end of an optical-fiber $34_0$ to $34_7$, are arranged in a row extending in a direction of following the reflected light beam as a scan angle of the light beam varies, and also divided into a plurality of repeating units $G_1$ to $G_n$ consisting of eight receiving elements $30_0$ to $30_7$ with the different indexes "0" to "7". Five repeating units $G_1$ to $G_5$ are shown in FIG. 1B. For example, the light receiving elements $30_0$ having the same index "0" are commonly coupled to a coupling element $35_0$ to unit a plurality of optical-fibers $34_0$ extending therefrom in one main optical-fiber $36_0$, and the main optical-fiber $36_0$ from the coupling element $35_0$ is connected to the corresponding photo detector $37_0$ to provide a single output indicative of the same index when the reflected light beam hits any one of the light receiving elements $30_0$ having the same index "0". Therefore, in this embodiment, the number of the photo detectors $37_0$ to $37_7$ is equal to the number of the light receiving elements $30_0$ to $30_7$ included in one repeating unit, that is, eight. The single output from the photo detector, for example, $37_0$, is sent to a position detector 41, in which the index "0" of the light receiving element $30_0$ hit by the reflected light beam is detected. The three-dimensional profile of the object is determined with the device having the above array sensor 32 in accordance with the following method including first and second stages of the present invention.

Figure 2:
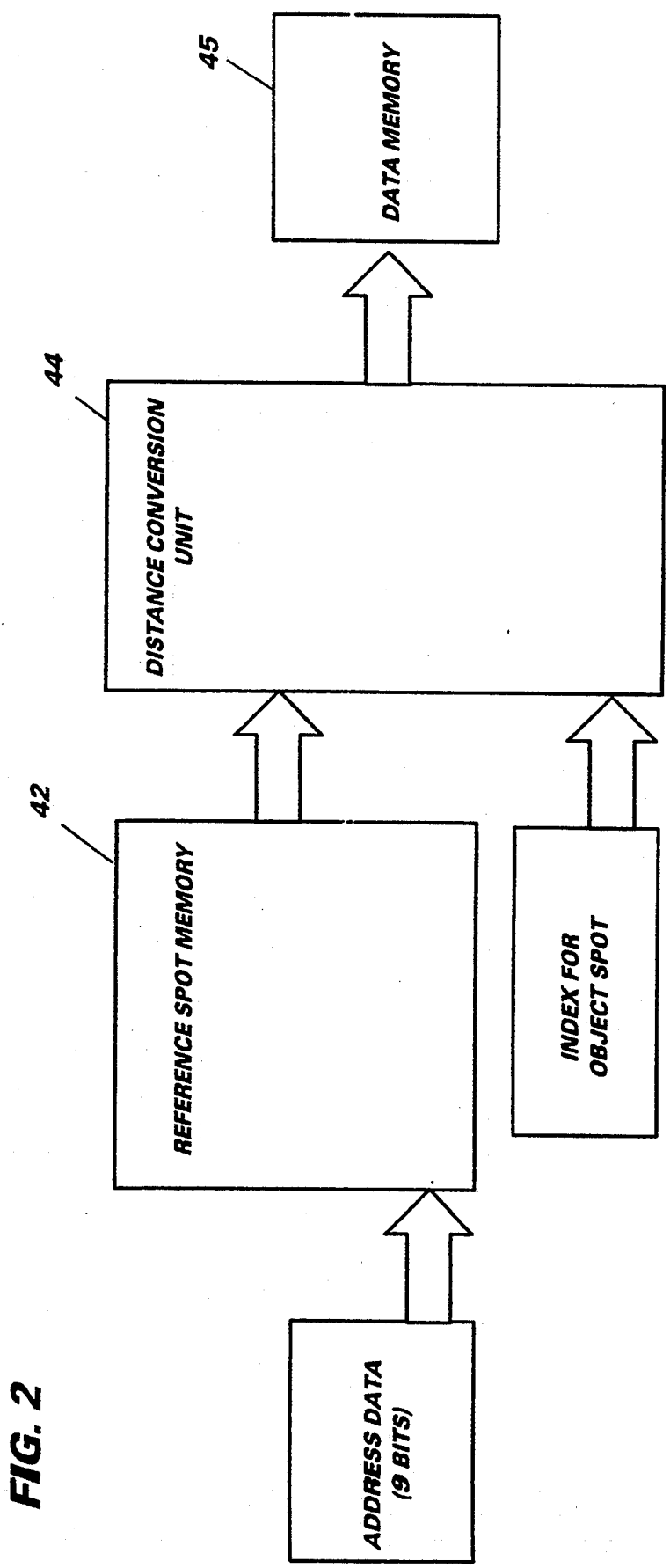
FIG. 2 is a schematic block diagram of an arithmetic operation unit utilized in the first embodiment.

In the first stage, the light beam is scanned onto a reference surface $P_o$ spaced by the already known distance from the array sensor 32 thereto. For example, during the scanning, when a light beam with a scan angle $\theta_1$ is directed onto a point P on the reference surface $P_o$, the reflected light beam from the point P forms an illumination spot $S_p$ on a receiving element $30_0$ in the repeating unit $G_4$ of the array sensor, as shown in FIG. 1B. Hereinafter, if necessary, one of the light receiving elements $30_0$ to $30_7$ in the repeating units $G_1$ to $G_5$ is represented by the following expression, $30_{(i,j)}$, wherein "i" is the subscript numeral of the light receiving element $33_0$ to $33_7$, and "j" is the subscript numeral of the repeating unit $G_1$ to $G_5$. For example, the illumination spot $S_p$, which is located at the receiving element $30_0$ in the repeating unit $G_4$, is represented by $30_{(0,4)}$. Since each repeating unit includes eight receiving elements $30_0$ to $30_7$, a specific index, for example, "0" in each repeating unit is distinguished by 3 bits. On the other hand, a specific repeating unit, for example, $G_4$, including the specific index "0" is determined in accordance with the known distance to the reference surface and the scan angle of the light beam for obtaining the illumination spot $S_p$. Thus detected index "0" in the repeating unit $G_4$ are defined as a reference spot corresponding to the scan angle $\theta_1$. With respect to individual points formed by scanning the light beam onto the reference surface $P_o$, the above proceeding in the first stage is repeated, so that a series of reference spots corresponding to the individual points are obtained. Each of the reference spots is related to specific one of the indexes of the light receiving elements. In this embodiment, it should be noted that although the point on the reference surface struck by the light beam is thought of as a "point", in fact due to the diameter of the light beam, it is more accurately an "a comparatively small area". The indexes of the reference spots detected by the position detector 41 and the corresponding scan angles provided from the scanner 10 are stored as address data of 9 bits in a reference spot memory 42, as shown in FIG. 2.

In the second stage, the light beam is scanned onto an object surface disposed on the reference surface. For example, during the scanning, when the light beam with the scan angle $\theta_1$ is directed onto a point q on the object surface $Q_o$, the reflected light beam from the point q forms an illumination spot $S_q$ on a receiving element $30_6$ in the repeating unit $G_3$ of the array sensor, as shown in FIG. 1B. The index "6" corresponding to the illumination spot $S_q$ is detected by the position detector 41 according to a single output from the photo detector $37_6$. For determining the repeating unit $G_3$ including the index "6", a detection range $D_p$ is defined with respect to the reference spots $S_p$ in such a manner that the detection range $D_p$ includes the reference spot $S_p$ and extends over eight receiving elements having the different indexes. With respect to the reference spots, a series of detection ranges are defined according to the manner. Depending upon a surface configuration of the object surface intended to be scanned, the detection ranges are capable of being shifted in opposite directions along the arrangement of the receiving elements, while keeping the corresponding reference spots in the detection ranges. The detection ranges are varied at a detection range setting unit 43. As shown in FIG. 1B, the detection range $D_p$ is defined such that the reference spot $S_p$ is positioned within the detection range $D_p$ at the fifth receiving element from the right end of the detection range $D_p$. In addition, since each detection range is set such that the illumination spot from the object surface obtained by the light beam with the scan angle is always included within the detection range having the reference spot corresponding to the scan angle, the repeating unit including the illumination spot is accurately determined. For example, the illumination spot $S_q$ is included within the detection range $D_p$ having the reference spot $S_p$. Of course, a positional deviation between the illumination spot from the object surface and the corresponding reference spot is also limited within the detection range.

Since the indexes of the reference spots in association with the scan angles are stored in the reference spot memory 42 before the light beam is scanned onto the object surface, when the index "6" of the illumination spot $S_q$ obtained by the light beam with the scan angle $\theta_1$ s provided to the detection range setting unit 43, the index "0" of the reference spot $S_p$ corresponding to the scan angle $\theta_1$ is also read out from the reference spot memory 42 to the detection range setting unit 43 in where the positional deviation between the indexes "0" and "6" of the illumination spot $S_q$ and the corresponding reference spot $S_p$ is determined. Since the detection range consists of eight receiving elements, the positional deviation within the detection range can be distinguished by 3 bits. In accordance with the positional deviation, a distance from the point q of the object surface to the reference surface $P_o$ is calculated at a distance conversion unit 44. Thus obtained distance and the corresponding scan angles are stored as a positional data of the object surface in a data memory 45. With respect to the individual points formed by scanning the light beam onto the object surface $Q_o$, the above proceeding in the second stage is repeated for obtaining a series of distances of the individual points relative to the reference surface $P_o$. Thus obtained distances are stored in the data memory 45 together with the scan angles. If necessary, the positional data of the object surface is read out from the data memory 45 to an image processing unit 46 to project the three-dimensional profile of the object on a monitor 47. The position detector 41, reference spot memory 42, detection range setting unit 43, distance conversion unit 44, and the data memory 45 are included in an arithmetic operation unit 40.

The method for determining the three-dimensional profile of the object of the present invention is also explained in accordance with flow charts shown in FIGS. 3 and 4. In FIG. 3 indicative of the first stage of the present method, the light beam is scanned onto the reference surface from the scanner (S1), so that a light point is moved on the reference surface as the scan angle of the light beam varies. The reflected light beam from the light point obtained when the light beam with a scan angle is directed onto the reference surface forms an illumination reference spot on any one of the light receiving elements (S2). The index of the receiving element corresponding to the illumination reference spot is detected at the position detector (S3), and on the other hand, the repeating unit including the index is determined in accordance with the scan angle and the known distance from the array sensor to the reference surface, etc., so that the receiving element corresponding to the illumination reference spot, that is, $30_{(i1, j1)}$, is determined (S4). Thus determined receiving element is stored as the address data in the reference spot memory 42 together with the corresponding scan angle (S5). The above steps S1 to S5 are repeated to form the series of the reference spots with respect to individual points obtained by scanning the light beam on the reference surface, so that the first stage is completed.

In FIG. 4 indicative of the second stage of the present method, the light beam is scanned onto a surface of the object disposed on the reference surface from the scanner (S6), so that a light point is moved on the object surface as the scan angle of the light beam varies. The reflected light beam from the light point obtained when the light beam with a scan angle is directed onto the object surface forms an illumination object spot on any one of the light receiving elements (S7). The index of the receiving element corresponding to the illumination object spot is detected at the position detector 41 (88). At the same time, a positional data with respect to the reference spot corresponding to the same scan angle, which is stored in the reference spot memory 42 at the first stage, is read out from the reference spot memory 42 (S9). In addition, the detection range is set at the detection range setting unit 43 such that the illumination object spot is included within the detection range with the corresponding reference spot (S10). Therefore, in accordance with analyzing the positional data from the reference spot memory 42 and the index of the illumination object spot detected at the position detector 41, the light receiving element corresponding to the illumination object spot, that is, $30_{(i2, j2)}$, is determined (S11). Of course, both receiving elements of $30_{(i1, j1)}$ and $30_{(i2, j2)}$ are included within the corresponding detection range. In addition, when the receiving elements $30_{i1}$ and $30_{i2}$ are included in the same repeating unit, the repeating unit $G_{j1}$ is equal to the repeating unit $G_{j2}$. A positional deviation between the receiving elements of $30_{(i1, j1)}$ and $30_{(i2, j2)}$ within the detection range is calculated at the detection range setting unit 43 (S12). Thus obtained positional deviation is converted to a distance from the light point on the object surface relative to the reference surface $P_o$ at the distance conversion unit 44 based upon the concept of triangulation (S13). The distance and the corresponding scan angle are stored as a profile data of the object in the data memory 45 (S14). The profile data is, if necessary, read out from the data memory 45, and projected on the monitor 47. The above steps S7 to S14 are repeated to obtain a series of profile data of the object with respect to the individual points formed by scanning the light beam on the object surface, so that the second stage is completed.

Figure 5A:
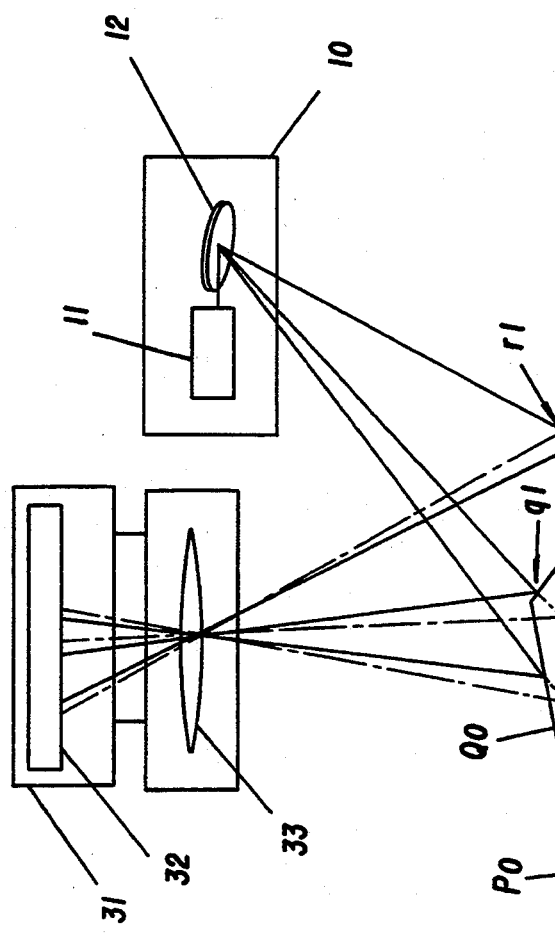
FIGS. 5A and 5B respectively show a diagrammatic front view of the device of the first embodiment in case of scanning a light beam onto an object surface irregular to a reference surface, and a schematic view illustrating the linear array sensor including detection ranges defined in this case.
Figure 5B:
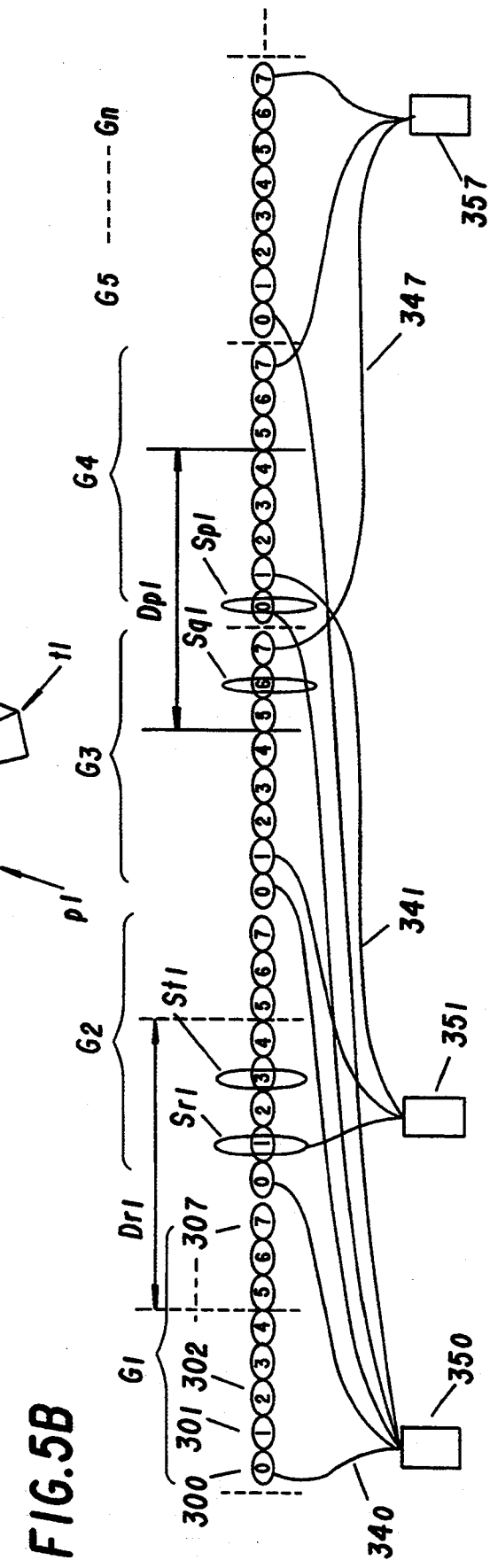
Figure 6A:
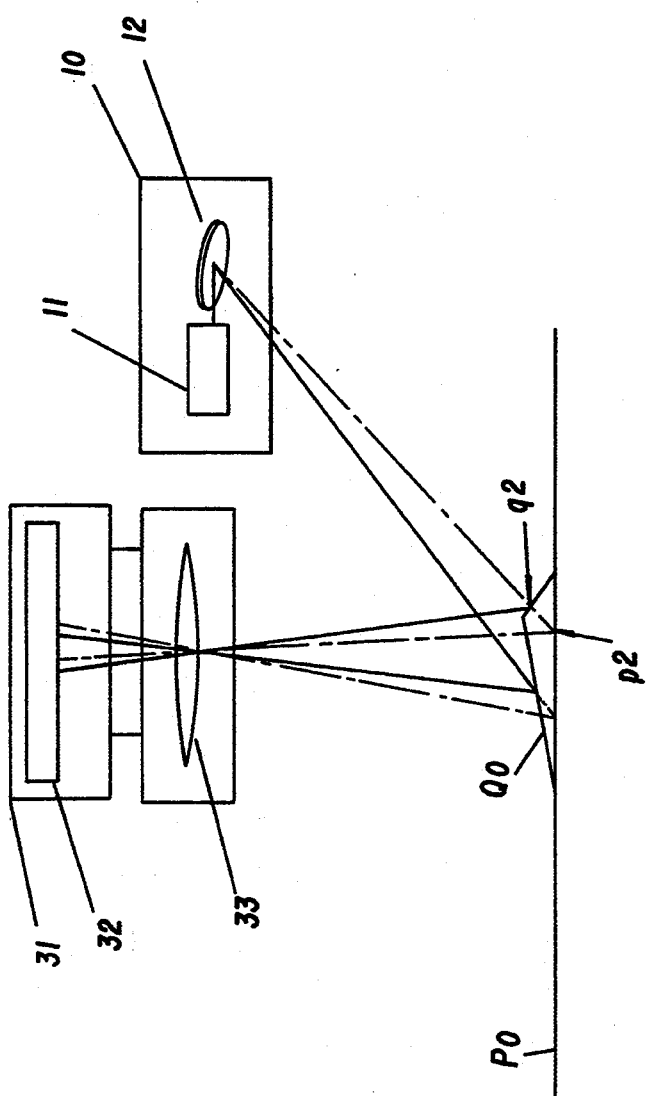
FIGS. 6A and 6B respectively show a diagrammatic front view of the device of the first embodiment in case of scanning a light beam onto an object surface convex to a reference surface, and a schematic view illustrating the linear array sensor including a detection range defined in this case.
Figure 6B:
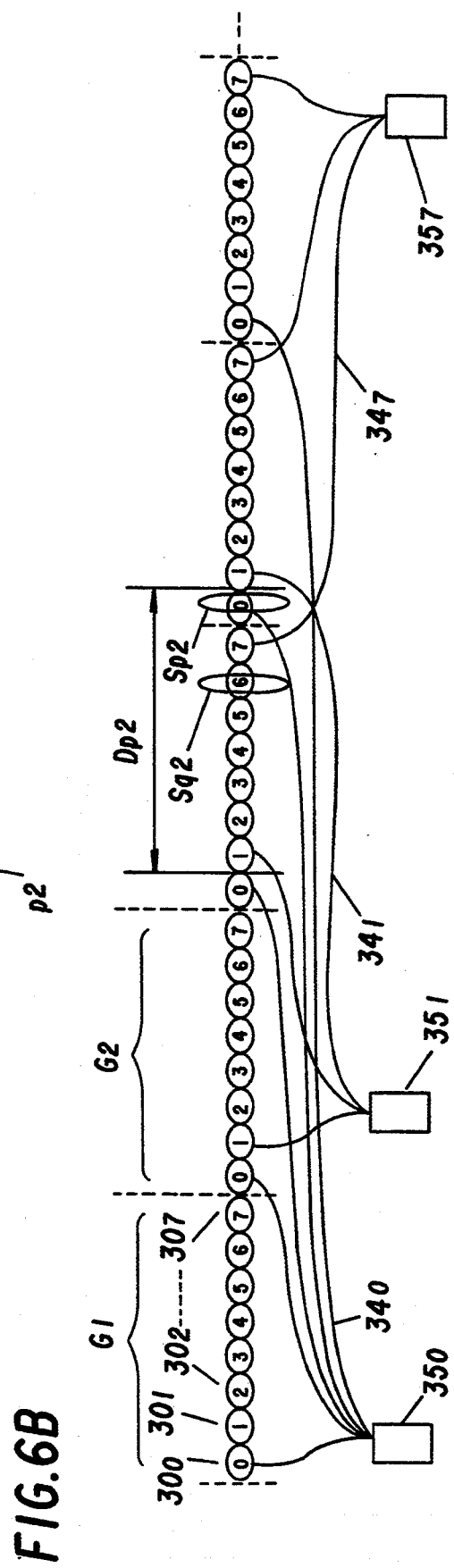
Figure 7A:
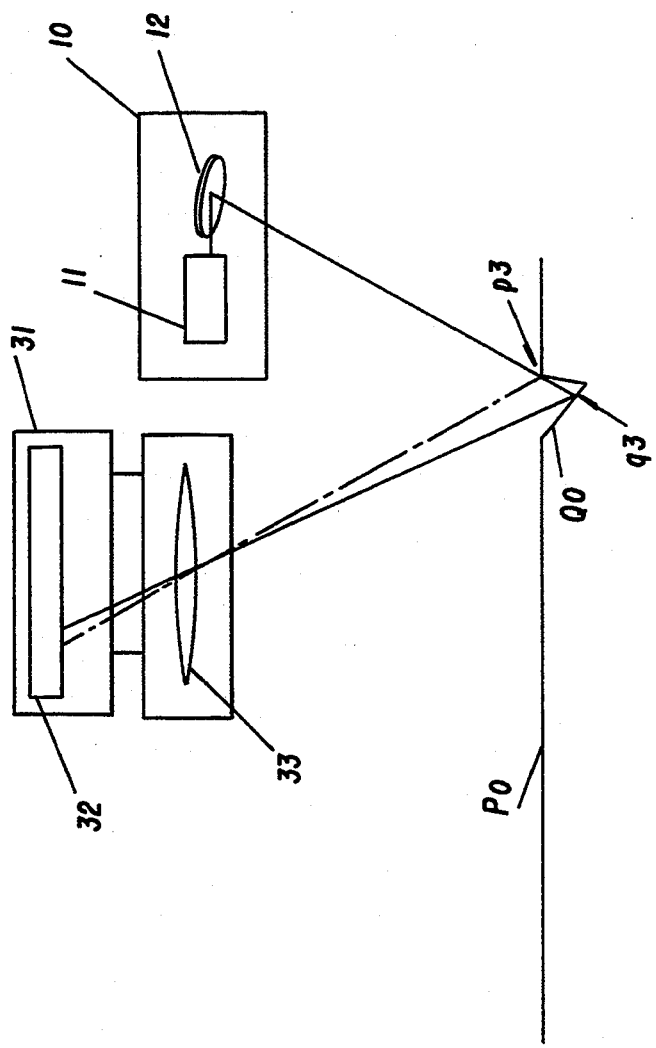
FIGS. 7A and 7B respectively show a diagrammatic front view of the device of the first embodiment in case of scanning a light beam onto an object surface concave to a reference surface, and a schematic view illustrating the linear array sensor including a detection range defined in this case.
Figure 7B:
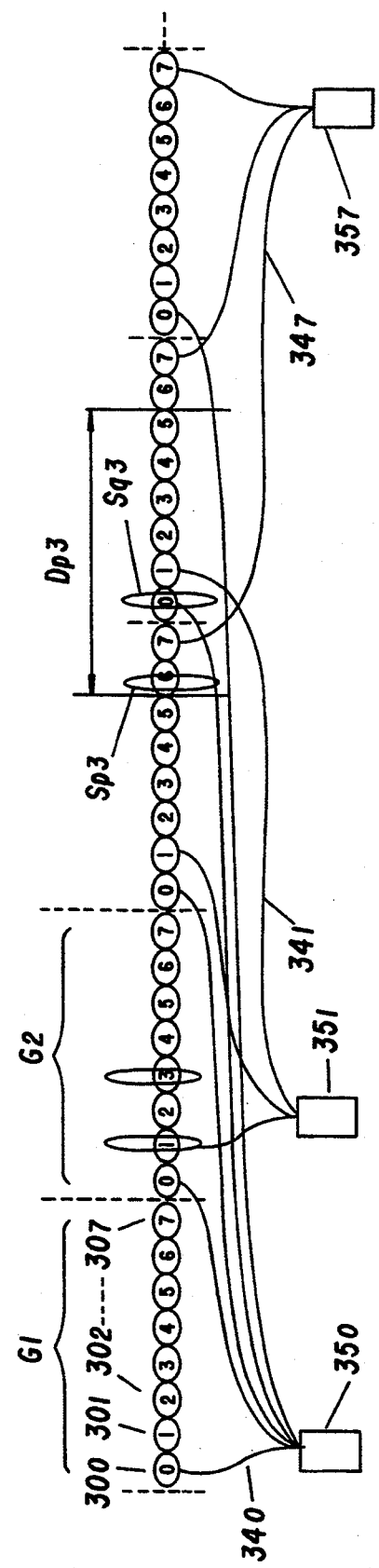

In the above embodiment, the detection range, for example, $D_p$ is defined such that the reference spot $S_p$ is positioned at the fifth receiving element from the right end of the detection range $D_p$, as shown in FIG. 1B. However, as described above, the detection range is capable of being shifted in opposite directions along the row of the array sensor depending upon the surface configuration of the object surface intended to be scanned. For example, in case of scanning the light beam on an object surface irregular to the reference surface, as shown in FIG. 5A, a detection range $D_{p1}$ is defined such as a reference spot $S_{p1}$ is positioned at the fifth receiving element from the right end of the detection range $D_{p1}$. An object spot $S_{q1}$ obtained by the reflected light beam from a point q1 on the object surface $Q_o$ is included within the detection range $D_{p1}$. On the other hand, a detection range $D_{r1}$ is defined such that a reference spot $Sr_1$ is positioned at the forth receiving element from the right end of the detection range $D_{r1}$, as shown in FIG. 5B. An object spot $S_{t1}$ obtained by the reflected light beam from a point t1 shown in FIG. 5A is included within the detection range $D_{r1}$. In case of scanning the light beam on the object surface convex to the reference surface, as shown in FIG. 6A, a detection range $D_{p2}$ is defined such that a reference spot $S_{p2}$ is positioned at the receiving element of the right end of the detection range $D_{p2}$, as shown in FIG. 6B. An object spot $S_{q2}$ obtained by the reflected light beam from a point q2 on the object surface $Q_o$ is included within the detection range $D_{p2}$. In case of scanning the light beam on the object surface concave to the reference surface, as shown in FIG. 7A, a detection range $D_{p3}$ is defined such that a reference spot $S_{p3}$ is positioned at the receiving element of the left end of the detection range $D_{p3}$, as shown in FIG. 7B. An object spot $S_{q3}$ obtained by the reflected light beam from a point q3 shown in FIG. 7A is included within the detection range $D_{p3}$.

Figure 8:
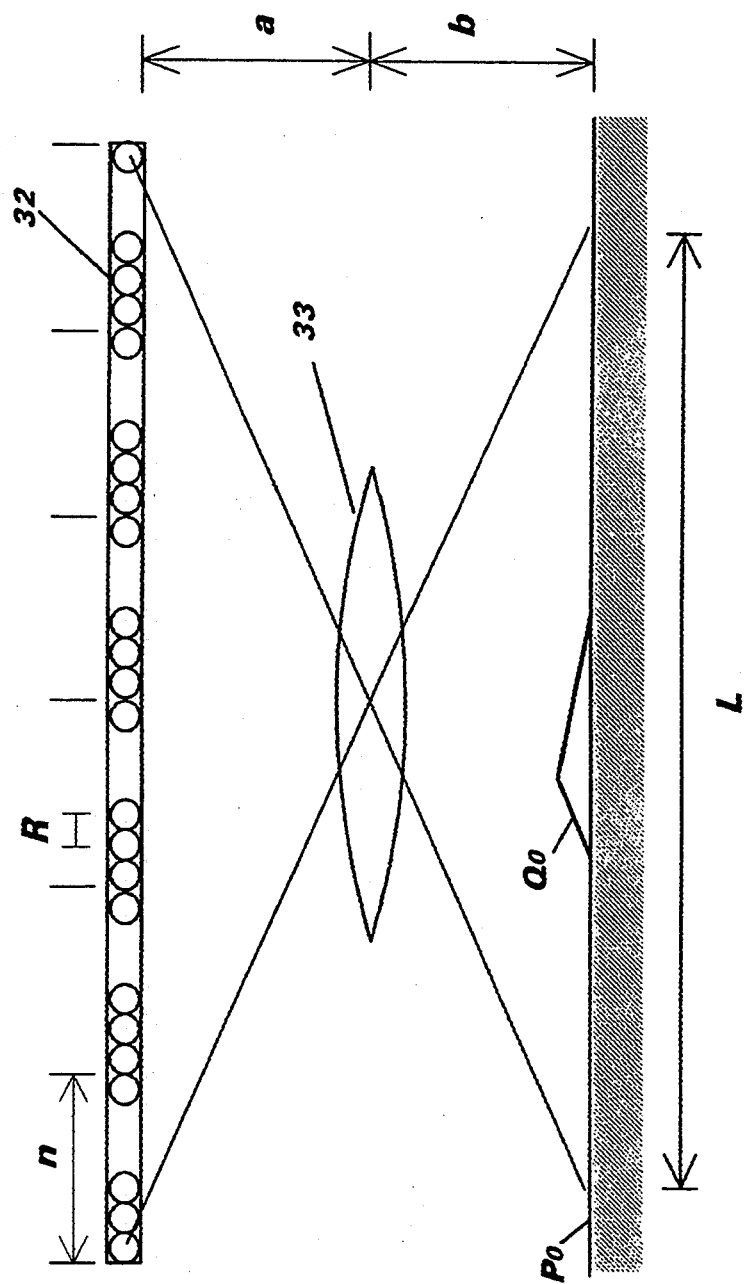
FIG. 8 is a schematic diagram illustrating a concept for designing the number of light receiving elements in the array sensor.

In addition, the number (M) of the repeating units is determined by the following equation, that is, $$M = m \cdot L / n \cdot R$$

wherein "m" is a magnification of the focusing lens 33 which is provided with b/a, as shown in FIG. 8, "L" is a length of a field of view intended to be inspected, "n" is the number of the light receiving elements $30_0$ to $30_7$ in one repeating unit, and "R" is a pitch of adjacent light receiving elements.

Figure 9:
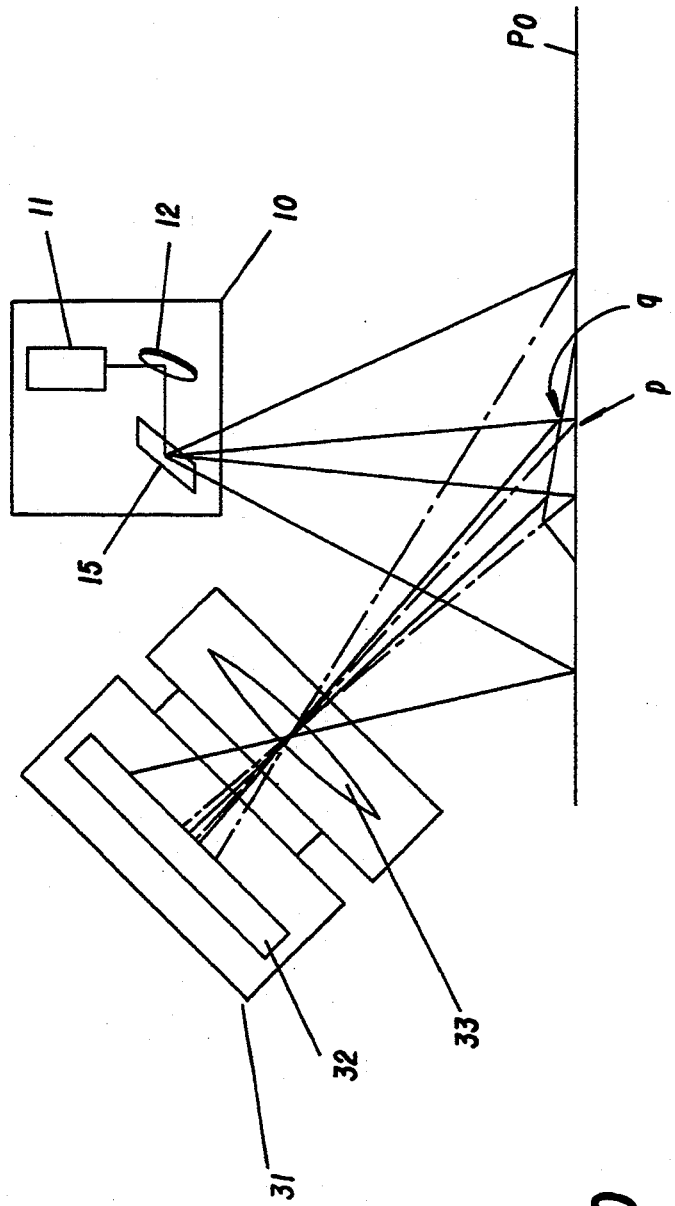
FIG. 9 shows an arrangement of a scanner and a light receiving unit according to a first modification of the first embodiment.

A first modification of the first embodiment is explained below. Though the focusing lens 33 is disposed to have its optical axis substantially perpendicular to the reference surface $P_o$ in the first embodiment, it is not concerned that the scanner 10 is disposed such that a light beam from the scanner 10 which is directed to the center point of a scan range on the reference surface has its beam axis substantially perpendicular to the reference surface, as shown in FIG. 9. It is preferred that a mirror 15 is arranged in the scanner 10 for setting the scanner 10 to the reference surface according to the first modification. The same method of determining the three-dimensional profile of the object as the first embodiment can be performed in the first modification.

Figure 10:
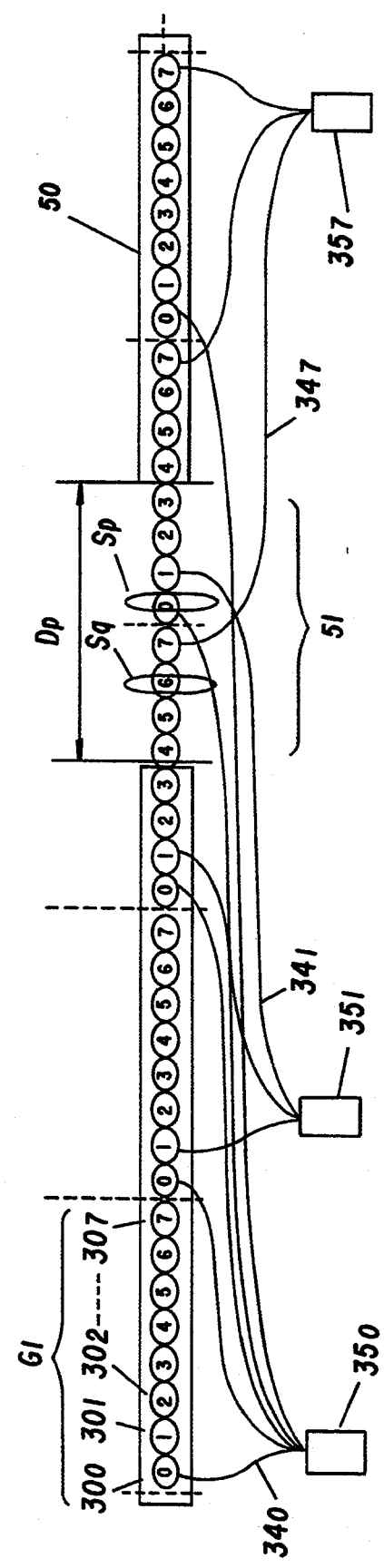
FIG. 10 shows a schematic view illustrating the linear array sensor covered with a shutter according to a second modification of the first embodiment.

A second modification of the first embodiment is explained below. A shutter 50 having a slit 51 extending over the length of one repeating unit is disposed on the array sensor 32 for shielding the light receiving elements $30_0$ to $30_7$ other than the detection range intended to receive the reflected light beam from the object surface. In FIG. 10, the slit 51 is located at the detection range $D_p$. The slit 51 is moved in the direction of the receiving elements $30_0$ to $30_7$ in synchronism with the scan angle of the light beam. Therefore, the three-dimensional profile of the object is stably determined with the device having the shutter 50 without causing a wrong operation of the device. It is also preferred that a liquid crystal shutter is used as the shutter 50.

Figure 11:
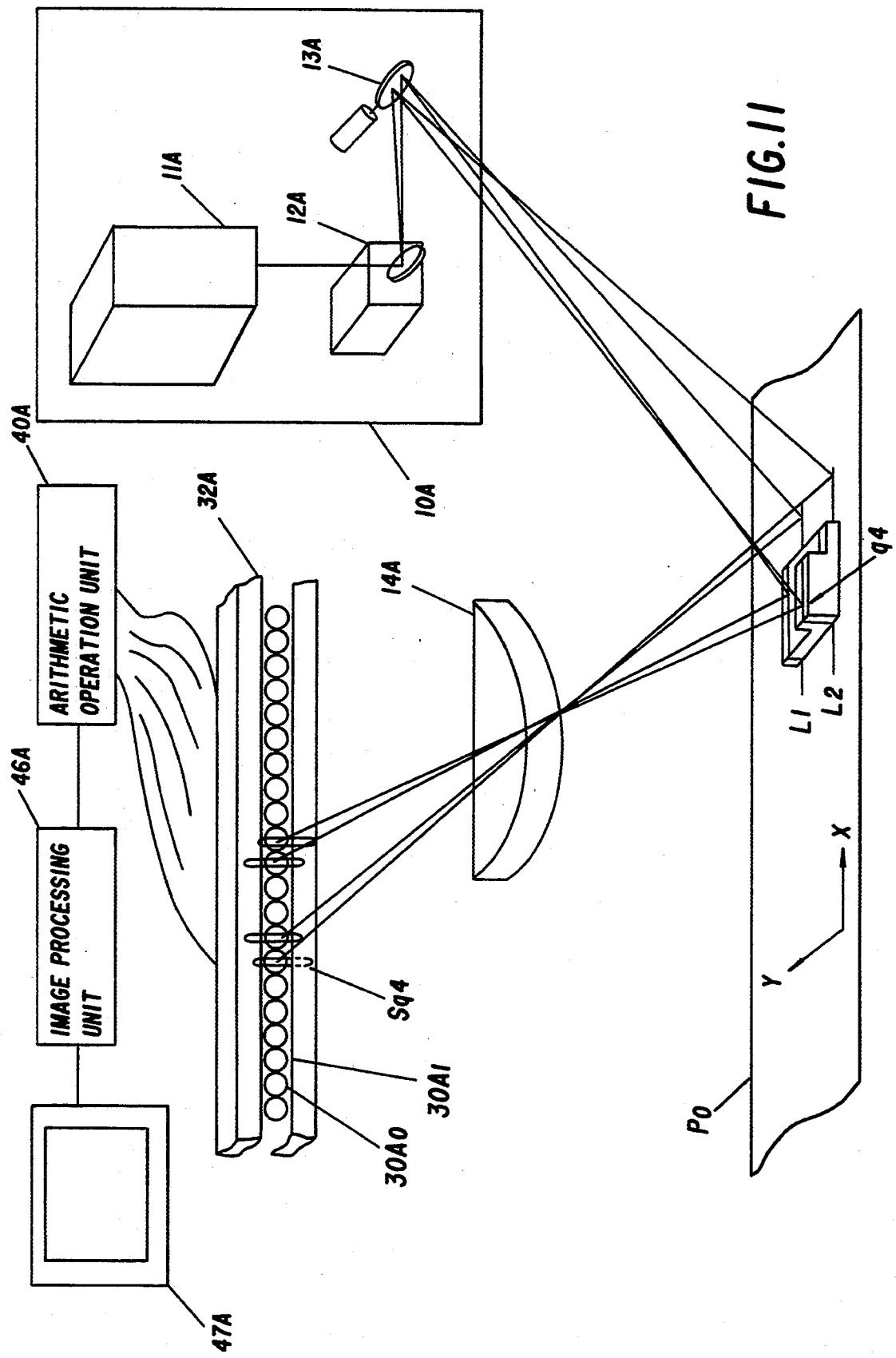
FIG. 11 shows a diagrammatic front view of the device in accordance with a third modification of the first embodiment.

A third modification of the first embodiment is shown in FIG. 11, in which the three-dimensional profile of the object is determined with a device utilizing a cylindrical lens 14A instead of the focusing lens 33 of the first embodiment. Therefore, no duplicate explanation to common parts and operation are deemed necessary. Like parts are designated by like numerals with a suffixed letter of "A". As shown in FIG. 11, a scanner 10A includes a light source 11A, and two deflection mirrors 12A and 13A for scanning the light beam in a raster pattern on the target surface. The raster pattern means a pattern of multiple straight parallel line, each line separated spatially in a direction orthogonal from the direction of the lines. Two mutually perpendicular axes are defined on the reference surface $P_o$, in which x axis extends along the direction of the lines and y axis extends along the direction orthogonal to the lines. In addition, the cylindrical lens 14A, which belongs to an anamorphic optical system, is arranged for forming an elongate illumination spot $S_{q4}$ on light receiving elements $30A_0$ to $30A_7$ in an array sensor 32A instead of the focusing lens 33 used in the first embodiment. A curved surface of the cylindrical lens 14A is disposed in a row direction of the receiving elements $30A_0$ to $30A_7$, as shown in FIG. 11. By passing the reflected light beam from the target surface through the cylindrical lens, the elongate illumination spot $S_{q4}$ extending to a direction perpendicular to the row direction is focused on the array sensor 32A. Therefore, even when the light beam is moved in the direction of the Y axis on the target surface by the deflection mirror 13A, the elongate illumination spot $S_{q4}$ is always formed on any one of the receiving elements $30A_0$ to $30A_7$. The three-dimensional profile of the object is accurately determined with the device having only one linear array sensor 32A in accordance with the same method as the first embodiment.

Figure 12:
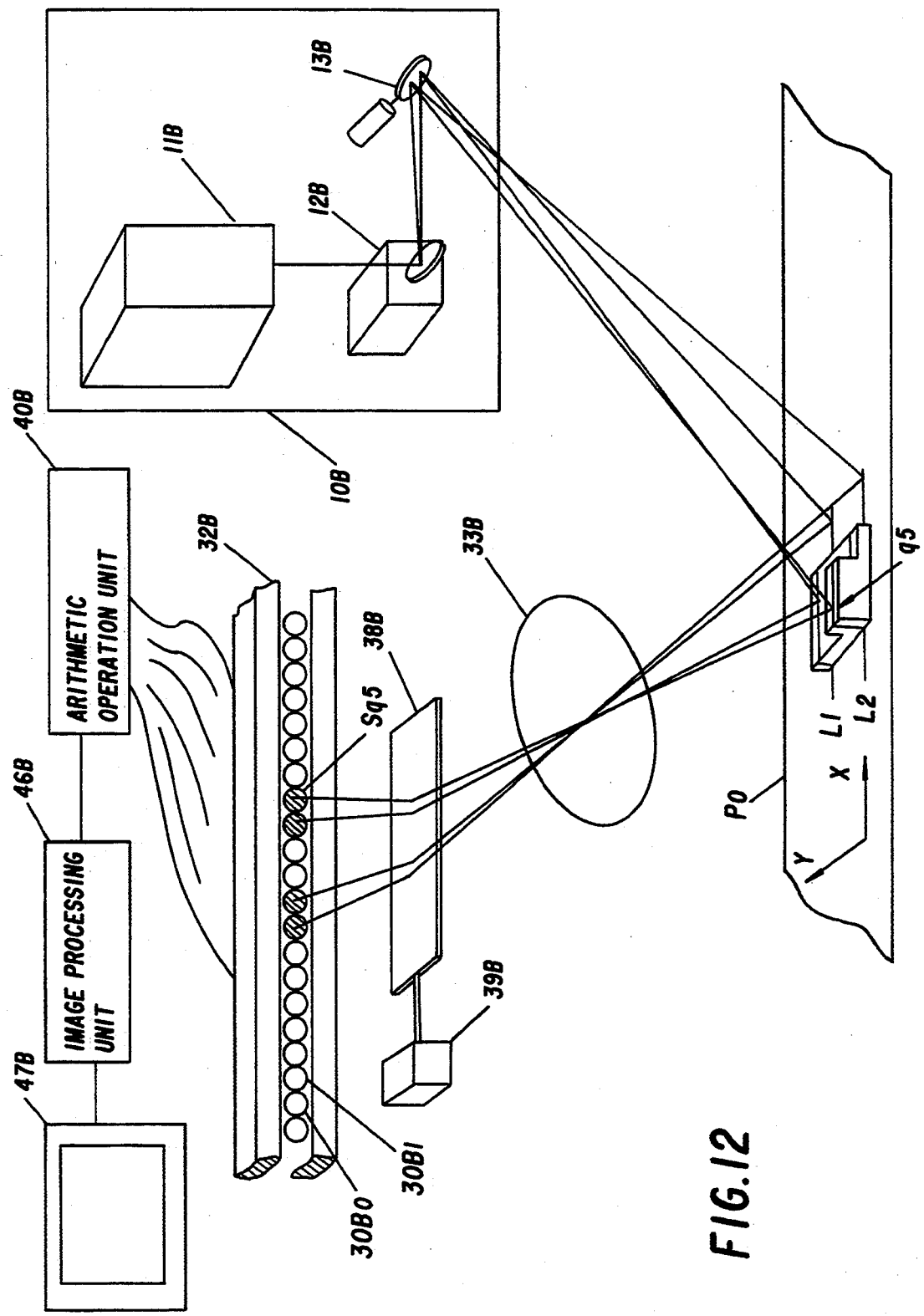
FIG. 12 shows a diagrammatic front view of the device in accordance with a forth modification of the first embodiment.

A forth modification of the first embodiment is shown in FIG. 12, in which the three-dimensional profile of the object is determined with a device utilizing a reflector 38B arranged between an array sensor 32B and the focusing lens 33B. Therefore, no duplicate explanation to common parts and operation are deemed necessary. Like parts are designated by like numerals with a suffixed letter of "B". As shown in FIG. 12, a scanner 10B includes a light source 11B, and two deflection mirrors 12B and 13B for scanning the light beam in the raster pattern on the target surface. The reflector 38B can be rotated about an axis extending in parallel with an arrangement of the receiving elements $30B_0$ to $30B_7$ by means of a step motor 39B, and also is controlled in synchronism with the deflection mirrors 12B and 13B such that the reflected light beam from the target surface always forms an illumination spot $S_{q5}$ on any one of the receiving elements $30B_0$ to $30B_7$ of the linea array sensor 32B. The three-dimensional profile of the object is determined with the device having only one linear array sensor 32B and the unique reflector 38B in accordance with the same method as the first embodiment.

Figure 13:
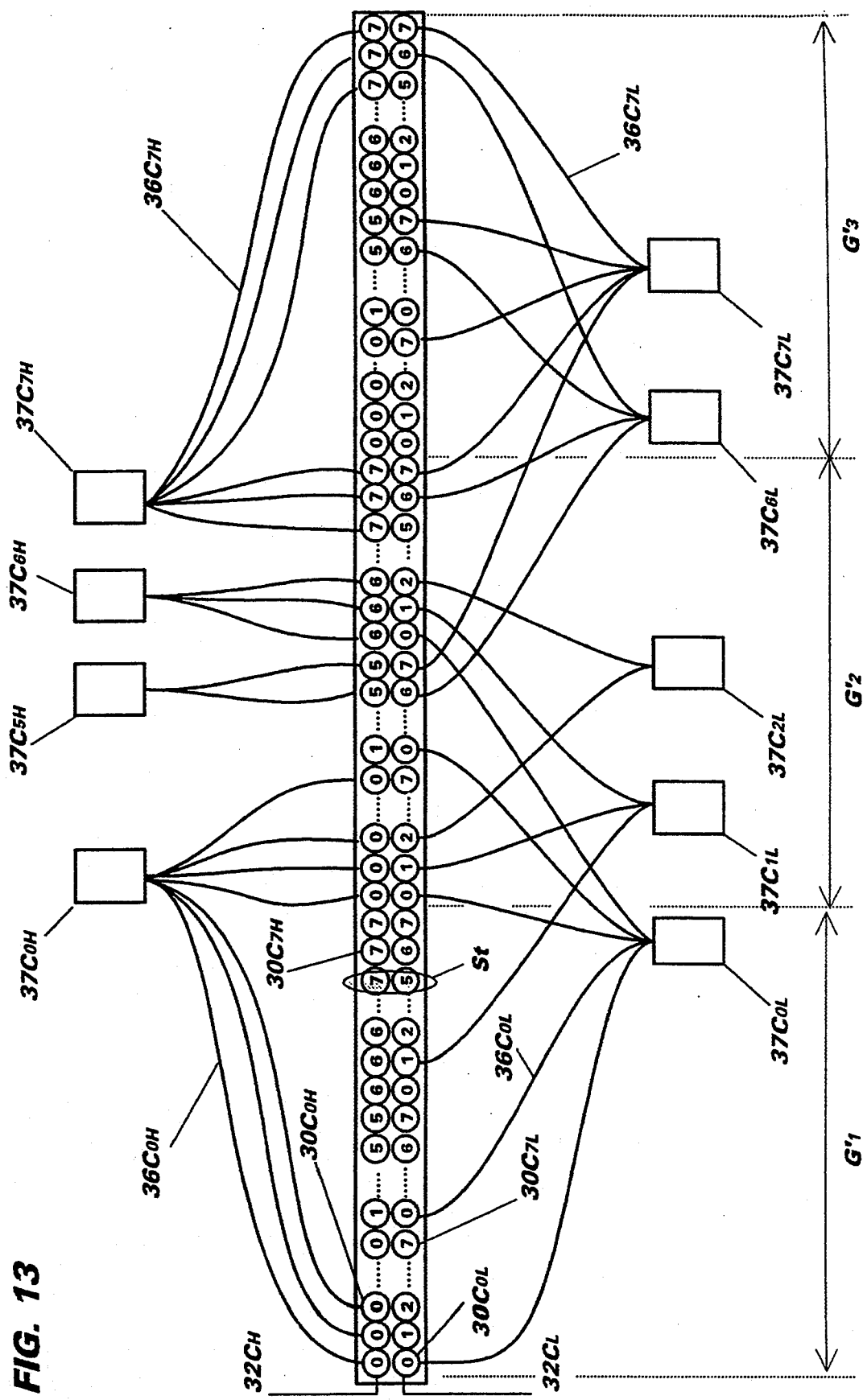
FIG. 13 shows a schematic view illustrating two linear array sensors utilized in a second embodiment of the present invention.

Second Embodiment [FIG.13]

The second embodiment of the present invention is shown in FIG. 13, in which the three-dimensional profile of the object is determined in accordance with the substantially same method as the first embodiment with a device utilizing two linear array sensors. Therefore, no duplicate explanation to common parts and operation are deemed necessary. As shown in FIG. 13, the two linear array sensors consisting of an upper array sensor $32C_H$ and a lower array sensor $32C_L$ are disposed in side-by-side relation such that the reflected light beam forms an illumination spot which straddle over the linear arrays $32C_L$ and $32C_H$. Each of the linear arrays includes a plurality of light receiving elements $30C_{0L}$ to $30C_{7L}$ and $30C_{0H}$ to $30C_{7H}$, and extends in a direction of following the reflected light beam as the scan angle of the light beam varies. In addition, the linear arrays $32C_L$ and $32C_H$ are divided into a plurality of repeating units $G'_1$ to $G'_n$, each of which consists 128 light receiving elements. The receiving elements $30C_{0H}$ to $30C_{7H}$ of the upper linear array $32C_H$ in each repeating units are divided into eight subdivisions, each of which includes eight receiving elements with the same index. The subdivisions of the upper linear array $32C_H$ have the different indexes from each other within one repeating unit. The receiving elements having the same index, for example, $30C_{0H}$, in the upper array sensor $32C_H$ are collectively coupled to a photo detector $37C_{0H}$. On the other hand, the receiving elements $30C_{0L}$ to $30C_{7L}$ of the lower array sensor $32C_L$ in each repeating unit are divided to eight subdivisions, each of which includes eight receiving elements having the different indexes, that is, "0" to "7". The receiving elements having the same index, for example, $30C_{7L}$ in the lower array sensor $32C_L$ are collectively coupled to a photo detector $37C_{7L}$. In FIG. 13, three repeating units $G'_1$ to $G'_3$ of the array sensors $32C_H$ and $32C_L$. When the reflected light beam forms an illumination spot on the array sensors $32C_H$ and $32C_L$, a position signal in a coded form comprising two digits is provided from two photo detectors associated with the receiving elements corresponding to the illumination spot. The high digit is the index of the receiving element in the upper array sensor $32C_H$, and the low digit is the index of the receiving element in the lower array sensor $32C_L$. For instance, when the reflected light beam is focused in the array sensors $32C_H$ and $32C_L$ to form an illumination spot $S_t$ at the illustrated position in FIG. 13, a coded signal "75" is provided from the receiving element $30C_{7H}$ having the index "7" in the upper array sensor $32C_H$ and the receiving element $30C_{5L}$ having the index "5" in the lower array sensor $32C_L$. In this manner, it should be noted that the linear array sensors $32C_H$ and $32C_L$ provide a resolution of 64 ($8 \times 8$) spots in one repeating unit. The repeating units $G'_1$ including the illumination spot $S_t$ is determined in accordance with the substantially same method as the first embodiment. The three-dimensional profile of the object is accurately determined with the device having the linear array sensors $32C_H$ and $32C_L$.

By the way, U.S. Pat. No. 5,102,226 describes that one repeating unit of the above array sensors is utilized as a position detector for determining the three-dimensional profile of the object. If a plurality of repeating units are utilized in the prior art for obtaining a wide dynamic inspection range, a huge number of the photo detectors are required to distinguish the repeating unit including the illumination spot from any other repeating units. However, the number of the photo detectors necessary for the array sensors of the second embodiment is substantially equal to the sum of the number of the receiving elements having the different indexes included in each array sensor, that is, only 16 ($8 \times 2 = 16$) photo detectors are required for obtaining the wide dynamic inspection range. Therefore, the device of the second embodiment is capable of determining the three-dimensional profile of the object with the wide dynamic inspection range without increasing the expensive photo detectors. Of course, it is possible to utilize array sensors arranged in three or more rows for improving the resolution in the present invention.

Third Embodiment [FIGS. 14 to 22]

Figure 14:
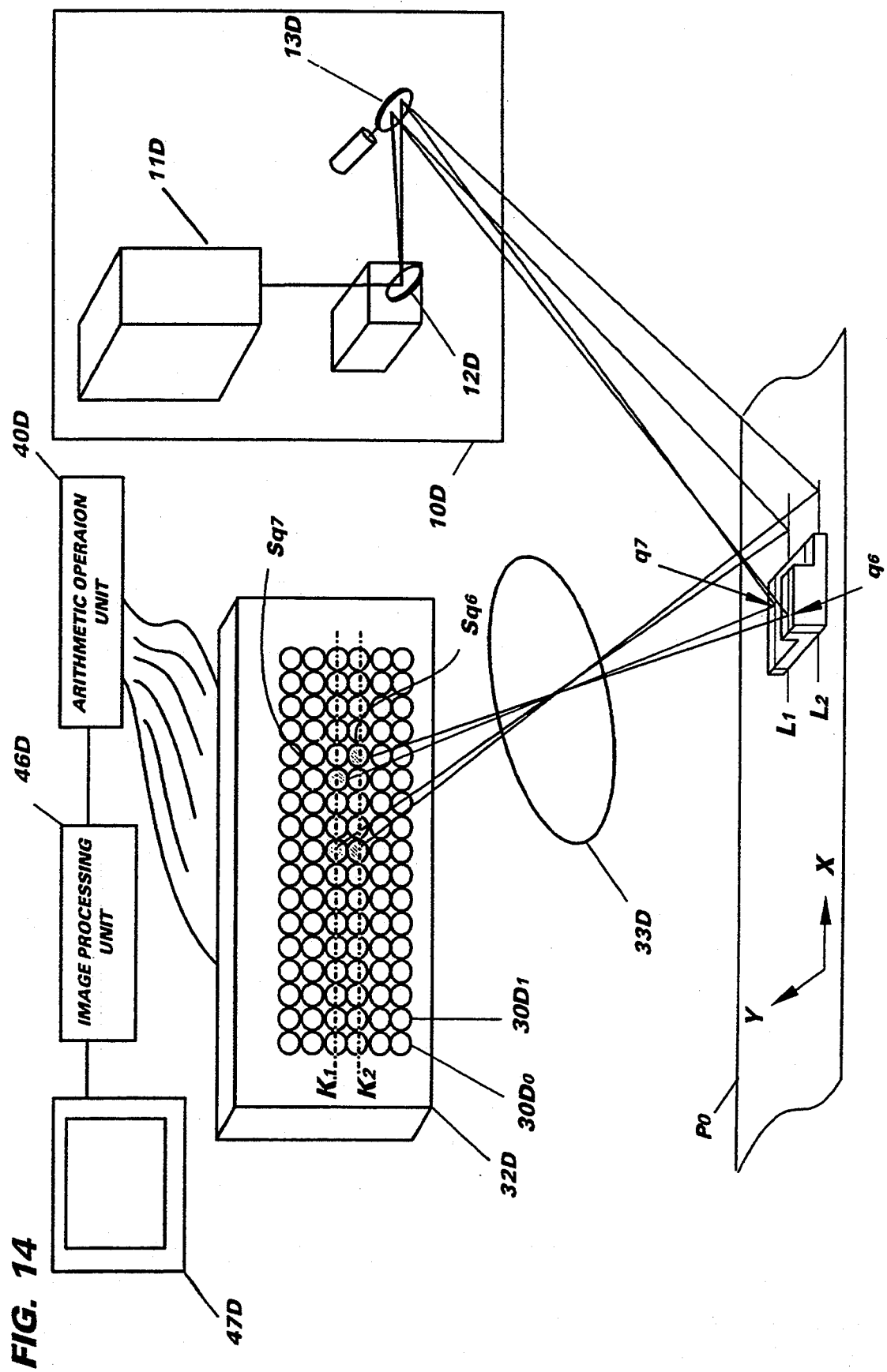
FIG. 14 shows a diagrammatic front view of a device for determining the three-dimensional profile of the object in accordance with a third embodiment of the present invention.
Figure 15:
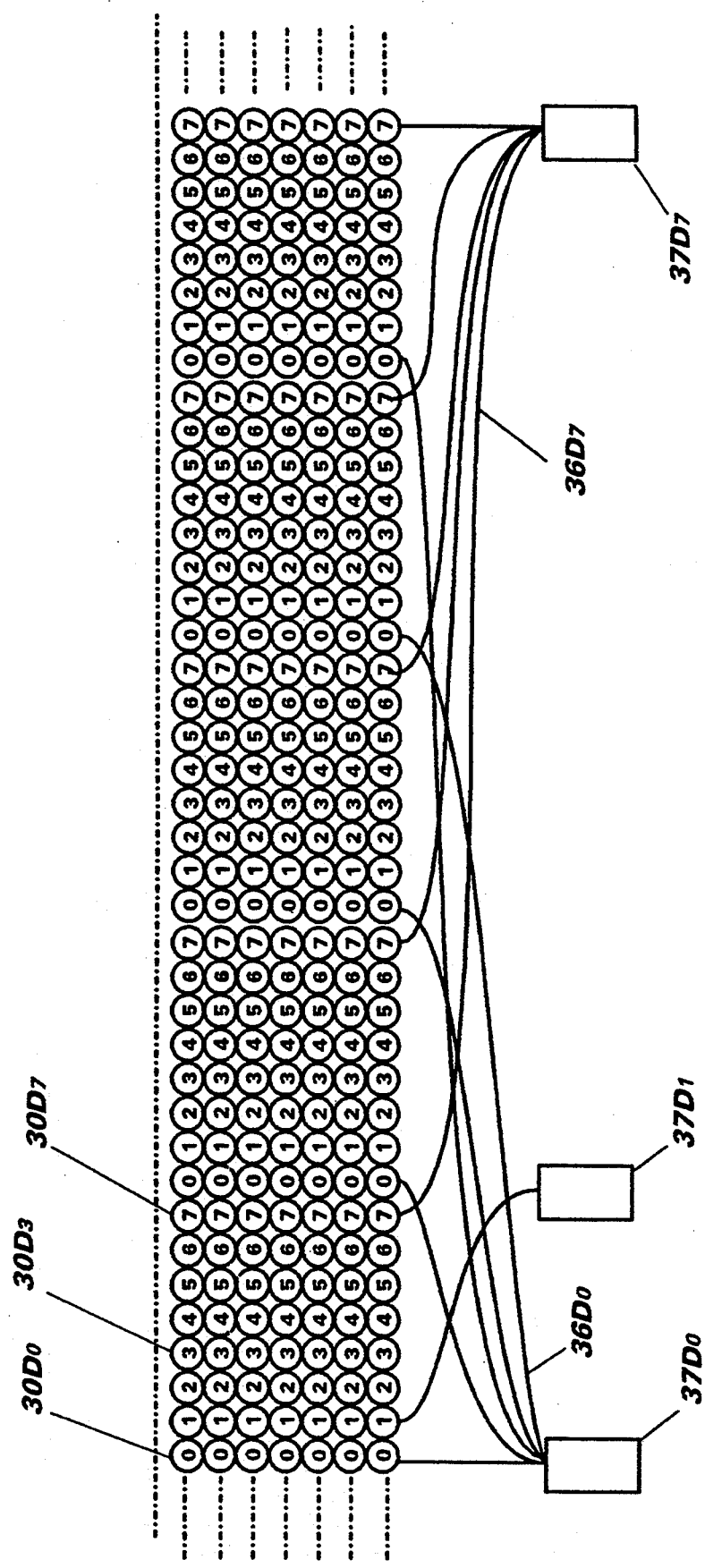
FIG. 15 shows a diagrammatic view illustrating array sensors of the third embodiment.

The third embodiment of the present invention is shown in FIG. 14, in which the three-dimensional profile of the object is determined in accordance with the substantially same method as the first embodiment with a device utilizing a plurality of array sensors. Therefore, no duplicate explanation to common parts and operation are deemed necessary. Like parts are designated by like numerals with a suffixed letter of "D". The light beam is scanned in the raster pattern on the object surface in the third embodiment. As shown in FIG. 11, a scanner 10D includes a light source 1D, and two deflection mirrors 12D and 13D for scanning the light beam in the raster pattern. A plurality of linear array sensors 32D, each of which is the same array sensor 32 as the first embodiment, are arranged on a plane perpendicular to its optical axis of a focusing lens 33D such that each array sensor 32D extends in the direction of following the reflected light beam as the light beam is scanned along the x axis. In addition, light receiving elements having the same index, e.g., "0" in the array sensors are commonly coupled to a photo detector $37D_0$ to provide a single output indicative of the same index when the reflected light beam hits any one of the light receiving elements having the same index "0". Therefore, as shown in FIG. 15, the number of the photo detectors necessary for the device of the third embodiment is equal to the number of the receiving elements $30D_0$ to $30D_7$ having the different indexes "0" to "7", that is, eight. For example, as shown in FIG. 14, when the light beam is directed to a point $q_6$ on a scan line L2 of the object surface, the reflected light beam from the point $q_6$ forms an illumination spot $S_{q6}$ on the receiving element of the array sensor 32D arranged on a line K2. On the other hand, when the light beam is directed to a point $q_7$ on a scan line L1 of the object surface, the reflected light beam from the point $q_7$ forms an illumination spot $S_{q7}$ on the receiving element of the array sensor 32D arranged on a line K1. In the use of this device, since the light beam is scanned in the raster pattern on the target surface by controlling the deflection mirrors 12D and 13D, a series of illumination spots are formed on each array sensor, so that the receiving elements corresponding to individual illumination spots are determined in accordance with the same method as the first embodiment. Thus determined receiving elements and the corresponding scan angles provided from the deflection mirrors 12D and 13D are analyzed to obtain the three-dimensional profile of the object.

Figure 16:
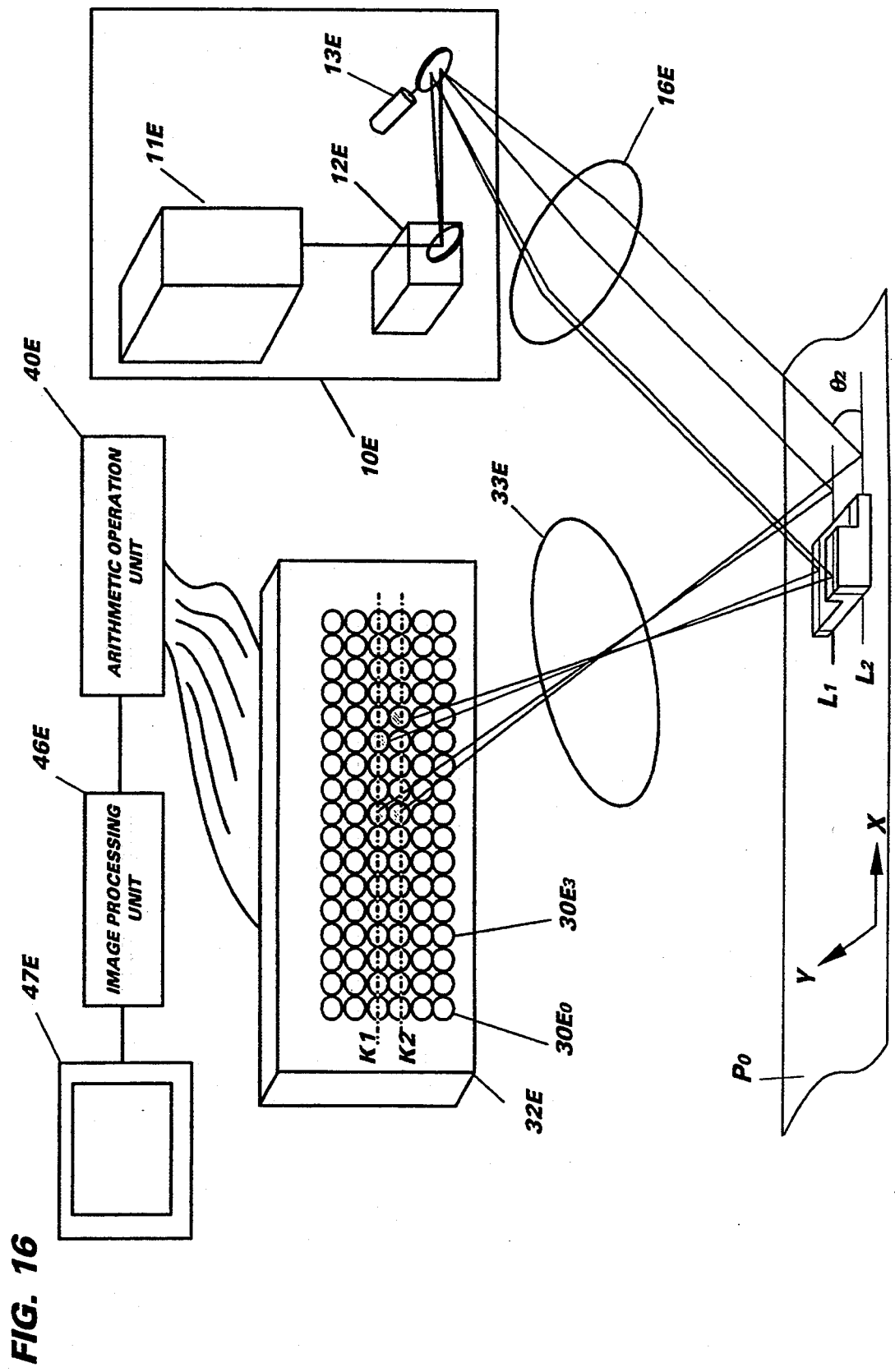
FIG. 16 shows a diagrammatic front view of the device in accordance with a first modification of the third embodiment.

A first modification of the third embodiment is shown in FIG. 16, in which the three-dimensional profile of the object is determined in accordance with the substantially same method as the third embodiment with a device utilizing an anamorphic lens 16E. Therefore, no duplicate explanation to common parts and operation are deemed necessary. Like parts are designated by like numerals with a suffixed letter of "E". The anamorphic lens 16E is arranged between a scanner 10E and the target surface for scanning a light beam with a constant incident angle $\theta_2$ on the target surface, as shown in FIG. 16. In case that the anamorphic lens 16E is not utilized in the device, it requires a correction in response to the different incident angles of the light beam. However, since such a correction is eliminated by using the anamorphic lens 16E, the device of this first modification is capable of determining the three-dimensional profile of the object with an improved rate of speed. In addition, it is not concerned that two cylindrical lenses are utilized instead of the anamorphic lens 16E.

Figure 17:
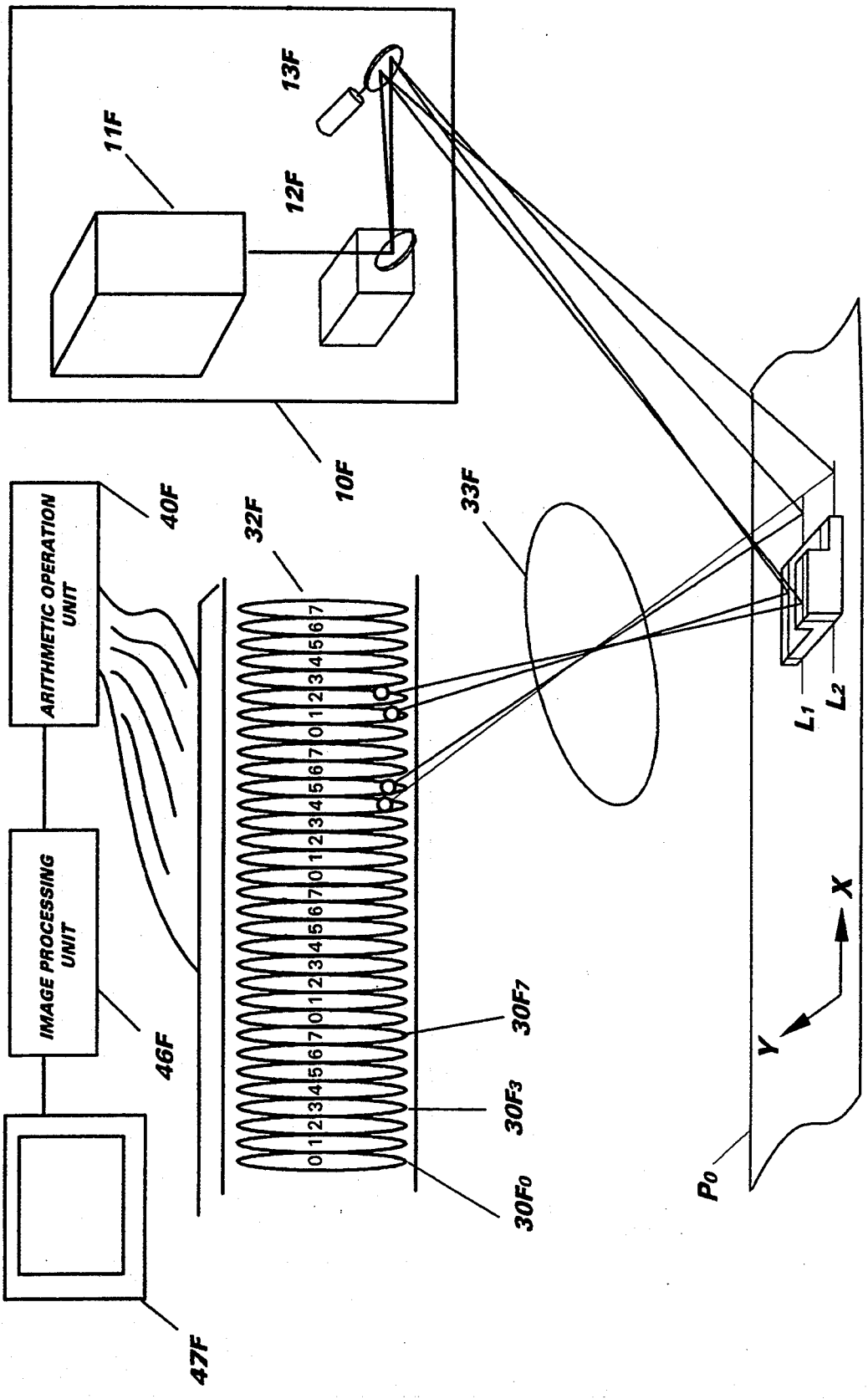
FIG. 17 shows a diagrammatic front view of the device according to a second modification of the third embodiment.

A second modification of the third embodiment is shown in FIG. 17, in which the three-dimensional profile of the object is determined in accordance with the substantially same method as the third embodiment with a device utilizing an linear array sensor 32F which consists of light receiving elements with a particular shape instead of the plural linear array sensors 32D of the third embodiment. Therefore, no duplicate explanation to common parts and operation are deemed necessary. Like parts are designated by like numerals with a suffixed letter of "F". Each light receiving elements $30F_0$ to $30F_7$ of the array sensor 32F has an elongate shape which extends in a direction perpendicular to the direction of following the reflected light beam as the light beam is scanned on the target surface along the x axis. Since a huge number of optical fibers corresponding to the number of the receiving elements are required in the third embodiment, it is a possibility of creating difficulties because of necessary complex wiring of the optical fibers to the photo detectors. However, in case of using the array sensor 32F consisting of such elongate receiving elements $30F_0$ to $30F_7$, the number of the optical fibers necessary for the device of this second modification is remarkably decreased.

Figure 18:
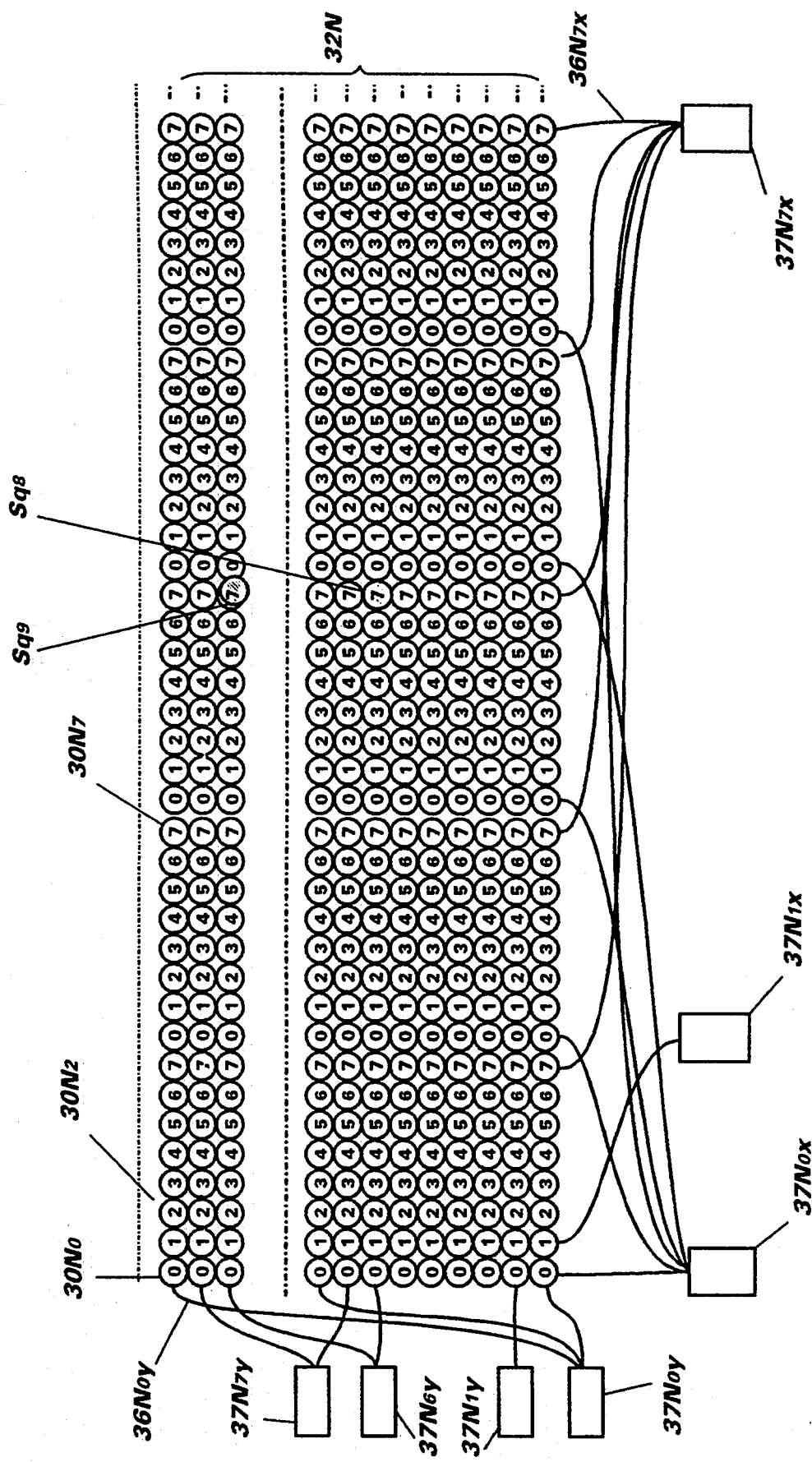
FIG. 18 shows a schematic view illustrating array sensors according to a third modification of the third embodiment.

A third modification of the third embodiment is shown in FIG. 18, in which the three-dimensional profile of the object is determined with a device having a particular wiring of optical fibers from light receiving elements to photo detectors. Therefore, no duplicate explanation to common parts and operation are deemed necessary. Like parts are designated by like numerals with a suffixed letter of "N". A plurality of array sensors 32N are arranged in the same manner as the third embodiment. The array sensors 32N are divided into a plural number of column groups. Each column group includes eight array sensors. The array sensors included in each column group are respectively connected to the different column photo detectors $37N_{0y}$ to $37N_{7y}$, as shown in FIG. 18. All receiving elements $30N_0$ to $30N_7$ in one array sensor are connected to the corresponding column photo detector. For example, all light receiving elements $30N_0$ to $30N_7$ in the array sensor 32N including an illumination spot $S_{q8}$ at the illustrated position in FIG. 18 are connected to the photo detector $37N_{6y}$. Therefore, the array sensor 32N including the illumination spot $S_{q8}$ can be determined by the column photo detector $37N_{6y}$. It is preferred that a scan counter (not shown) are utilized in the third modification to distinguish the array sensor 32N including an illumination spot $S_{q9}$, which is also connected to the photo detector $37N_{6y}$, from the array sensor 32N including the illumination spot $S_{q8}$. That is, the array sensor 32N having an illumination spot in the array sensors 32N commonly coupled to one of the column photo detectors $37N_{0y}$ to $37N_{7y}$ is determined by the scan counter. However, the receiving element corresponding to the illumination spot in the array sensor 32N can not be detected by the column photo detectors $37N_{0y}$ to $37N_{7y}$. On the other hand, the light receiving elements having the same index in the array sensors 32N are commonly connected to one of row photo detectors $37N_{0x}$ to $37N_{7x}$ to provide a single output indicative of the same index when the reflected light beam hits any one of the light receiving elements having the same index. Therefore, the index corresponding to the illumination spot can be detected by the row photo detectors $37N_{0x}$ to $37N_{7x}$. For example, the index "7" corresponding to the illumination spot $S_{q8}$ is detected by the row photo detector $37N_{7x}$. Since the array sensor 32N including the illumination spot is detected by the column photo detector and the scan counter, an accurate position of the receiving element corresponding to the illumination spot is determined in accordance with the substantially same method as the third embodiment. The three-dimensional profile of the object is accurately determined with the device having the column and row photo detectors $37N_{0y}$ to $37N_{7y}$ and $37N_{0x}$ to $37N_{7x}$ without referring to the scan angle provided from a deflection mirror for moving the light beam in the direction of the Y axis.

Figure 19:
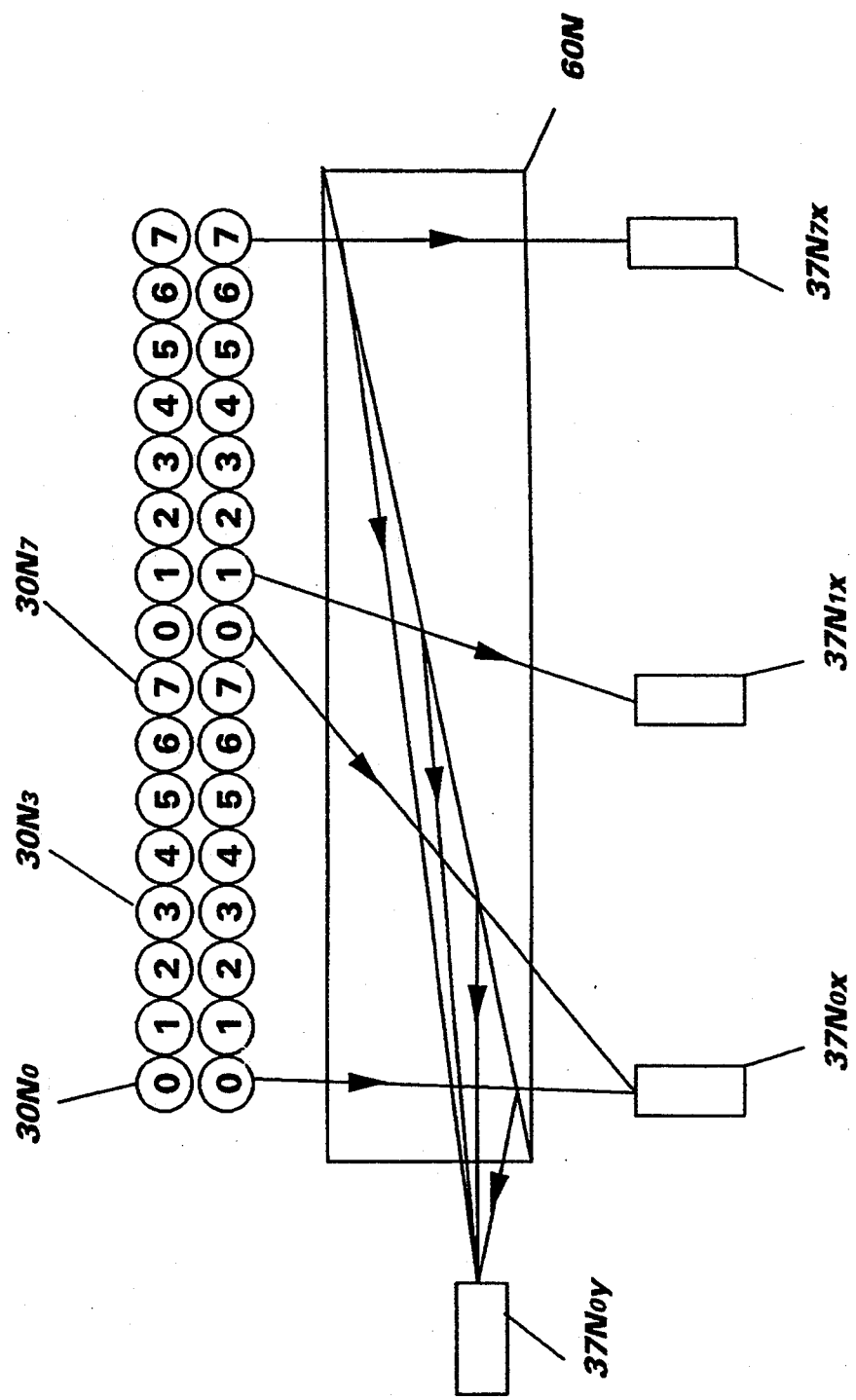
FIG. 19 shows a schematic view illustrating an optical fiber wiring with respect to the array sensors of the third modification.

Since an optical output from each light receiving element $30_0$ to $30_7$ is divided into the corresponding column and row photo detectors $37N_{0y}$ to $37N_{7y}$ and $37N_{0x}$ to $37N_{7x}$, it is also preferred that a plurality of photo partition units 60N corresponding to the number of the receiving elements are provided to the device of the third modification. A schematic diagram of the photo partition unit 60N is shown in FIG. 19.

Figure 20:
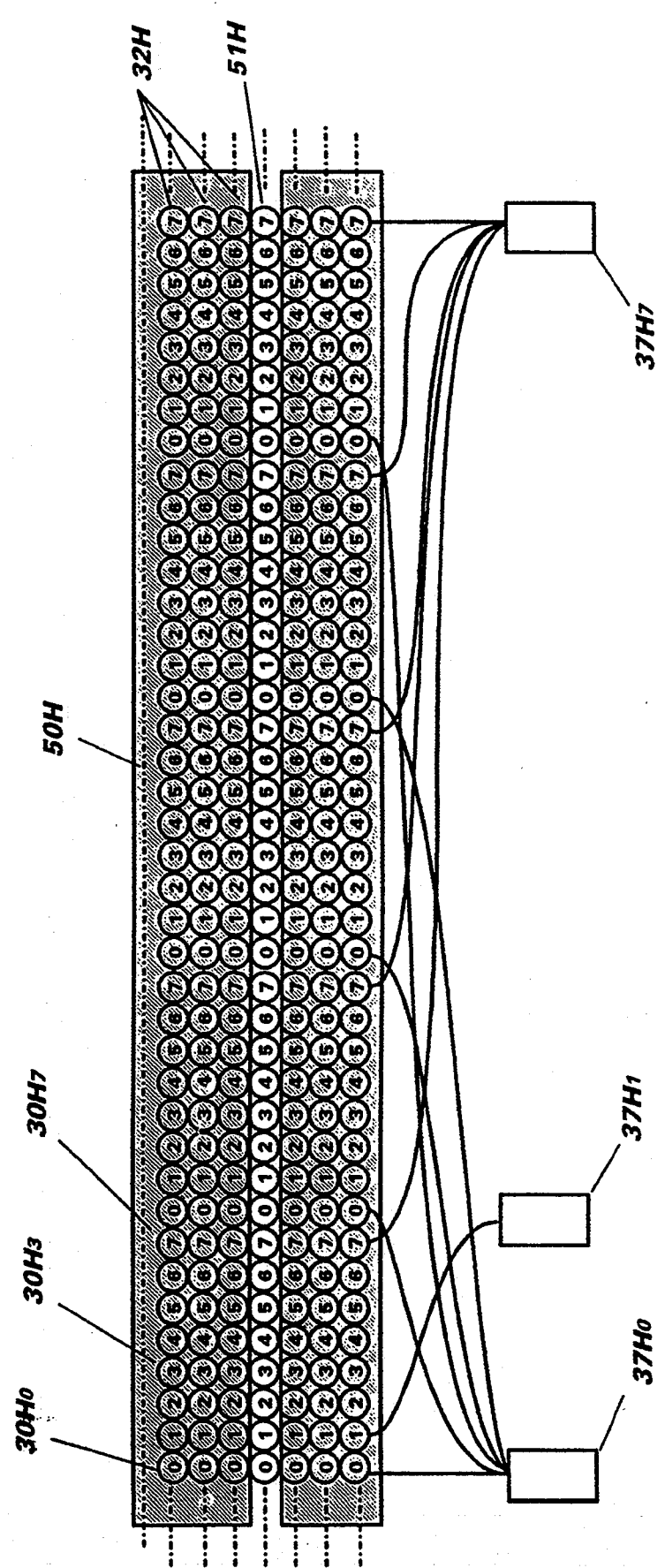
FIG. 20 shows a schematic view illustrating array sensors covered with a shutter according to a forth modification of the third embodiment.

A forth modification of the third embodiment is explained below. As shown in FIG. 20, a shutter 50H having a slit 51H extending over the length of an array sensor 32N is disposed on the array sensors 32N for shielding the light receiving elements $30H_0$ to $30H_7$ other than the array sensor 32N intended to receive the reflected light beam from the target surface. The slit 51H is moved in a direction perpendicular to the linear array sensor 32H in synchronism with the scan angle from a deflection mirror for moving the light beam in the direction of the Y axis. Therefore, the three-dimensional profile of the object is stably determined with the device having the shutter 50H without causing a wrong operation of the device. It is also preferred that a liquid crystal shutter is used as the shutter 50H.

Figure 21:
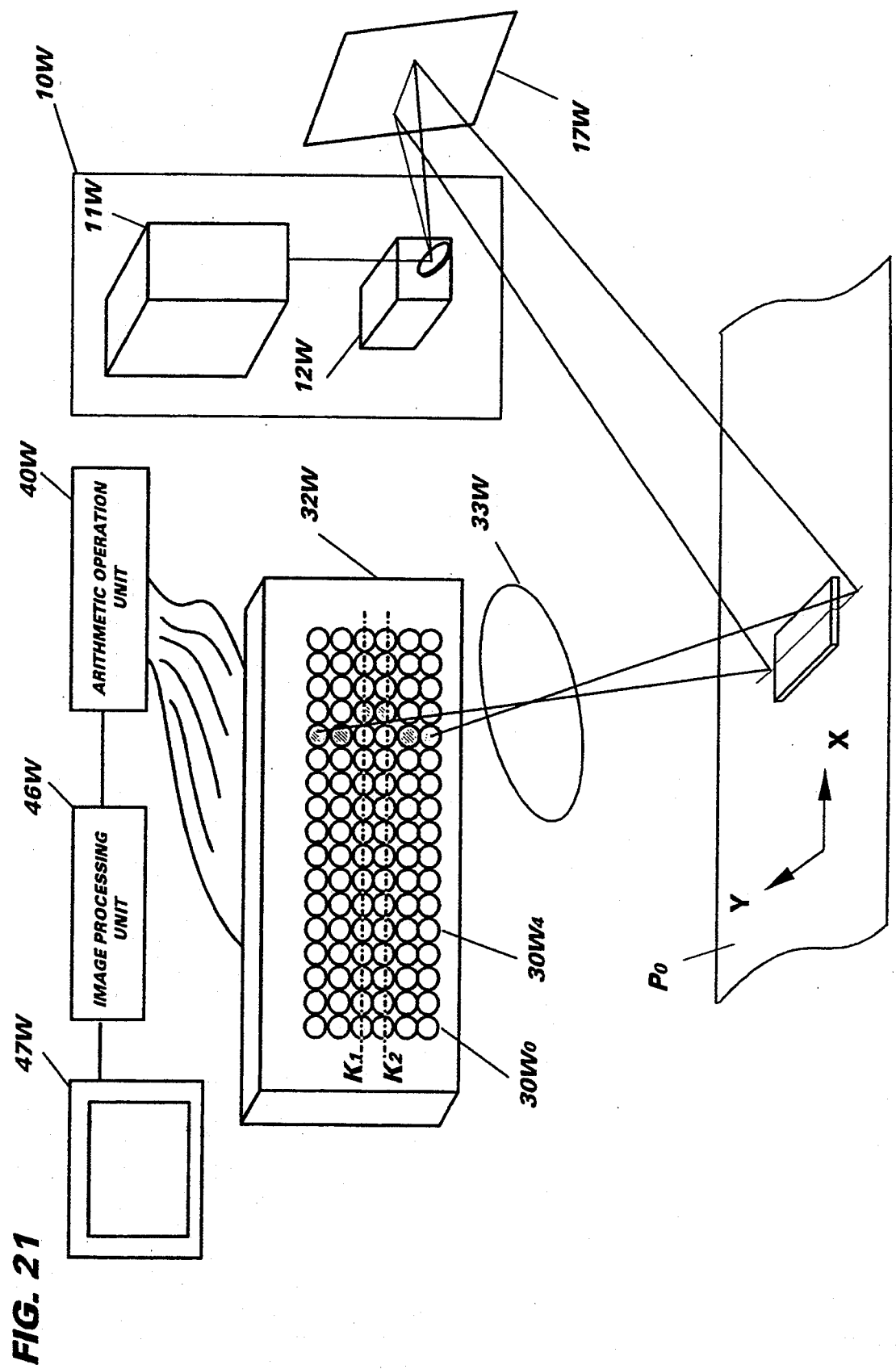
FIG. 21 shows diagrammatic front view of the device in accordance with a fifth modification of the third embodiment.
Figure 22:
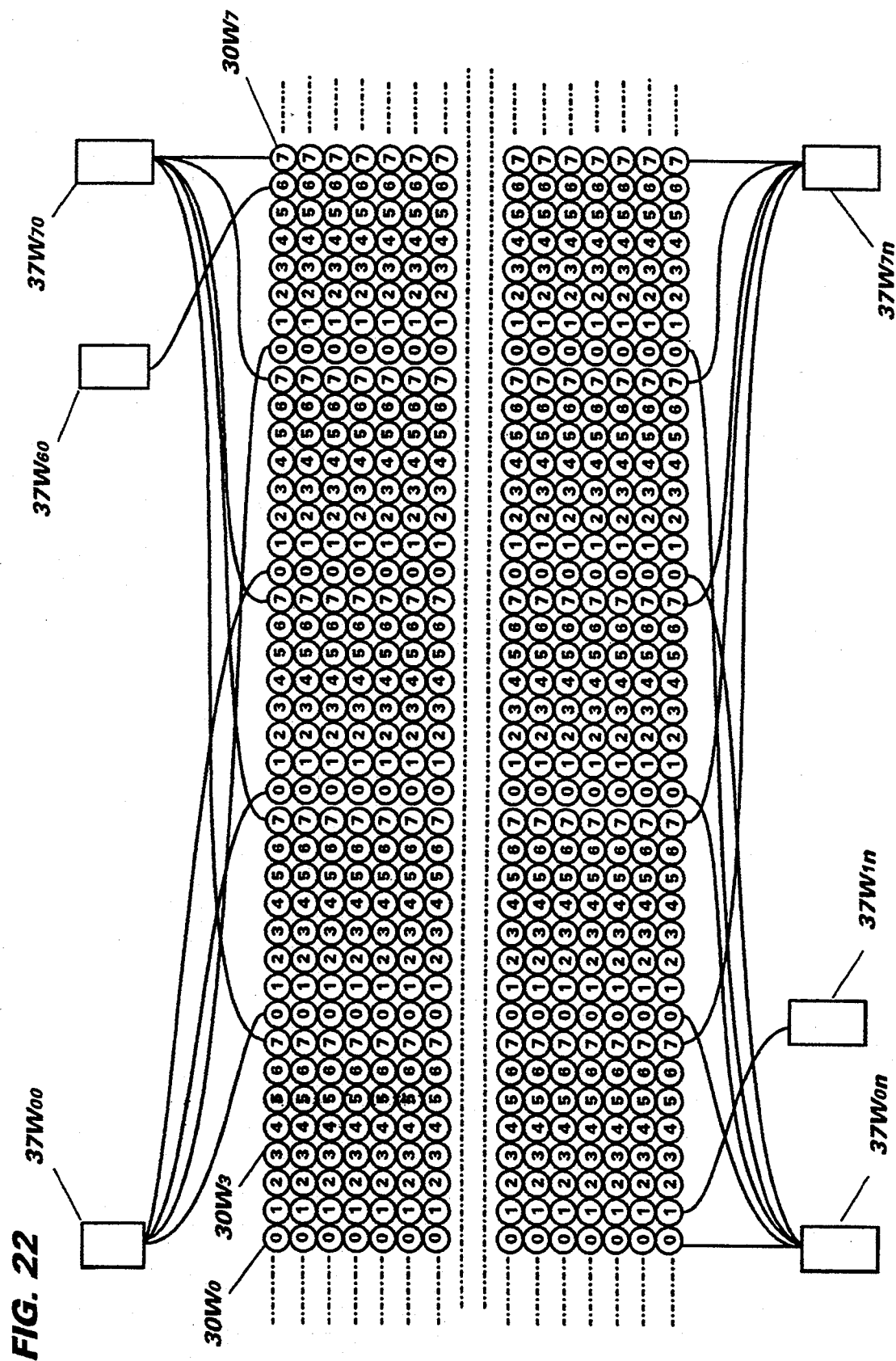
FIG. 22 shows a schematic view illustrating array sensors in the fifth modification.
Figure 23:
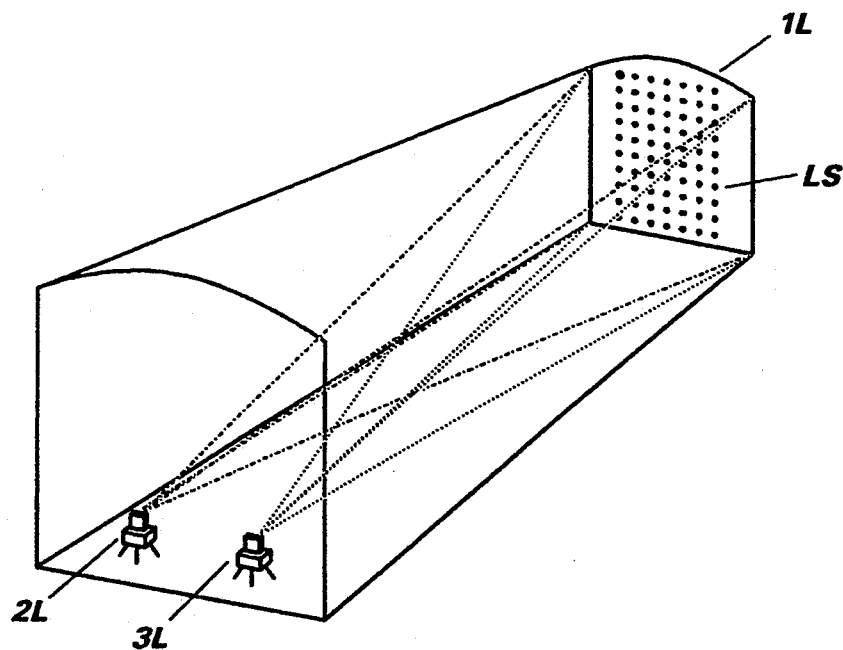
FIG. 23 is a diagrammatic view of an optical measurement system of a prior art.
Figure 24:
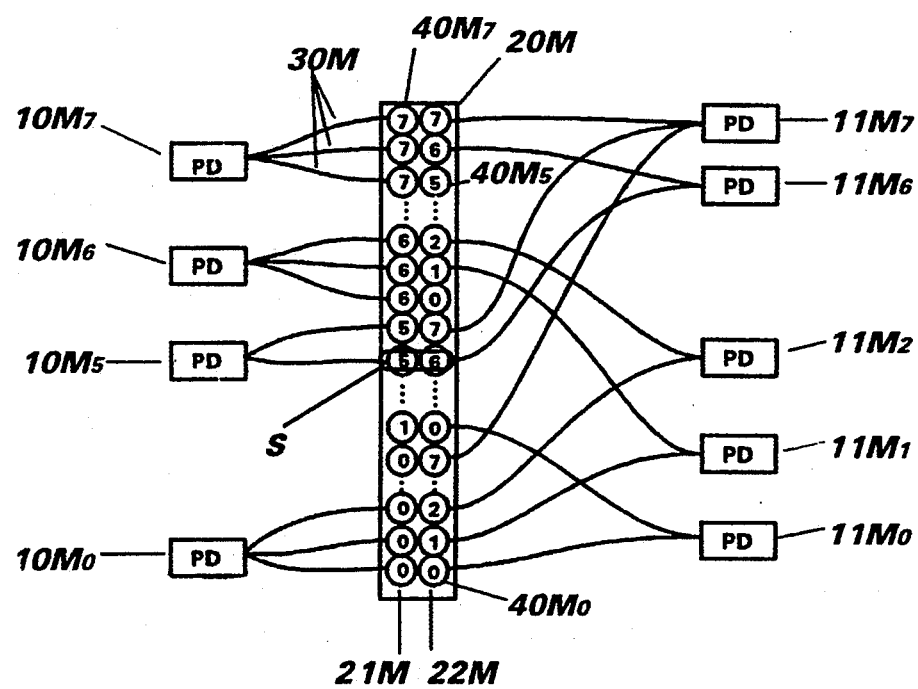
FIG. 24 is a schematic view illustrating a position detector utilized in another prior art

A fifth modification of the third embodiment is shown in FIG. 21, in which the three-dimensional profile of the object is determined in accordance with the substantially same method as the third embodiment with a device utilizing a fixed reflector 17W instead of the deflection mirror 13D of the third embodiment. Therefore, no duplicate explanation to common parts and operation are deemed necessary. Like parts are designated by like numerals with a suffixed letter of "W". The fixed reflector 17W effects as a diffuse reflector. The light beam reflected at the reflector 17W forms a light line on the target surface. The light line extends in parallel with the Y axis. A plurality of illumination spots, which are formed by the reflected light beam from the light line, are simultaneously formed on linear array sensors 32W. Light receiving elements $30W_0$ to $30W_7$ of the array sensors 32W are coupled to photo detectors $37W_{00}$ to $37W_7$, as shown in FIG. 22. That is, the array sensors 32W are divided into a plurality of column groups. Each column group includes a limited number of the array sensor 32W. The light receiving elements having the same index in each column group are commonly connected to the corresponding photo detector to provide a single output indicative of the same index when the reflected light beam hits any one of the light receiving elements having the same index in the column group. Therefore, eight photo detectors are prepared to each column group. For example, when the array sensors 32W are divided into 32 column groups, the number of the photo detectors necessary in this case is 256 ($8 \times 32 = 256$). In the fifth modification, the indexes corresponding to the illumination spots is simultaneously detected by the corresponding photo detectors $37W_{00}$ to $37W_{7n}$. Based upon the indexes, accurate positions of the light receiving elements $30W_0$ to $30W_7$ corresponding to the illumination spots are determined in accordance with the method of the present invention. Though the device of the fifth embodiment needs a huge number of the photo detectors $37W_{00}$ to $37W_{7n}$, it has an advantage that the three-dimensional profile of the object is determined with an increased rate of speed.

In the above embodiments and their modifications, it is usually preferred that the coupling element for uniting a plurality of optical-fibers from the light receiving elements in one main optical-fiber is arranged between the light receiving elements and each photo detector. However, if the optical-fibers from the light receiving elements are directly coupled to the corresponding photo detector, it is not concerned that the coupling element can be omitted.

What is claimed is:

1. A method of determination of a three-dimensional profile of an object with a light source for emitting a light beam onto a target surface and an array sensor spaced by a distance from said light source for receiving the reflected light beam from said target surface;

said array sensor comprising a plurality of light receiving elements arranged in a row extending in the direction of following the reflected light beam, said light receiving elements being divided into a plurality of repeating units consisting of the same number of said light receiving elements, said light receiving elements in each of said repeating units being assigned respectively to different row indexes, said light receiving elements having the same row index being commonly coupled so as to provide a single row output indicative of the same row index when the reflected light beam hits any one of the light receiving elements having the same row index;

said method comprising the following first and second steps:

said first step comprising:

1) directing a first light beam from said light source onto a first point on a reference surface so that the reflected light beam from said first point forms on said array sensor a first illumination spot;

2) detecting the row index of said light receiving element corresponding to the first illumination spot and defining thus detected row index as a reference spot;

repeating the above proceedings 1) and 2) with respect to individual points formed by scanning the light beam onto the reference surface to obtain on said array sensor a series of reference spots corresponding to said individual points, so that each of said reference spots is related to specific one of the row indexes of said light receiving elements;

defining within said array sensor a series of detection ranges respectively for said individual reference spots in such a manner that each of said detection ranges includes corresponding one of said reference spots and extends over a limited number of said light receiving elements, said limited number being not more than the number of said light receiving elements in said repeating unit;

said second step comprising:

3) directing said first light beam onto a second point on a surface of the object disposed on the reference surface so that the reflected light from said second point on said object surface forms on said array sensor a second illumination spot;

4) detecting the row index of said light receiving element corresponding to the second illumination spot and defining thus detected row index as a detected spot which falls within the detection range corresponding to said reference spot obtained by said first light beam;

5) analyzing a positional deviation between said detected spot within the detection range and said reference spot obtained with respect to said first light beam to determine a position of the second point of said object surface relative to the reference surface; and repeating the above proceedings 3), 4) and 5) with respect to individual points formed by scanning the light beam onto said object surface to obtain a series of positions of the individual points on said object surface relative to the reference surface for determination of the three-dimensional profile of the object surface.

2. A method of determination of a three-dimensional profile of an object with the use of a light source for emitting a light beam onto a target surface and an array sensor spaced by a distance from said light source for receiving the reflected light beam from said object surface;

said array sensor comprising a plurality of light receiving elements arranged in at least two linear arrays each extending in a row along the direction of following the reflected light beam, said linear arrays disposed in side-by-side relation such that the reflected light beam forms an illumination spot which straddle over said linear arrays;

each of said linear arrays being divided into plural repeating units consisting of the same number of said light receiving elements;

each said light receiving element forming each one of said repeating units in a first one of said linear arrays being designated by a first value which is common within each unit but is different between the different ones of said units, such that said light receiving elements in the first array designated by the same first value are collectively coupled to produce a single first output indicating said first value when sensing the light beam, the light receiving elements in each of said repeating units forming a second one of said linear arrays being designated respectively by second values which are different from each other within said repeating unit but are common to each other between the different units, said light receiving elements designated by the same second value in said second linear array being commonly coupled so as to provide a single second output indicating said second value when any one of the light receiving elements designated by the same second value senses the light beam; and means for providing a row index in the form of a code comprising at least a first digit of said first value indicating which one of said light receiving elements in said first array provides said first output and a second digit of said second value indicating which one of the light receiving elements in said second array provides said second output.

said method comprising the following first and second steps: said first step comprising:

1) directing a first light beam from said light source onto a first point on a reference surface so that the reflected light beam from said first point forms on said array sensor a first illumination spot;

2) detecting the row index of said light receiving element corresponding to the first illumination spot and defining thus detected row index as a reference spot;

repeating the above proceedings 1) and 2) with respect to individual points formed by scanning the light beam onto the reference surface to obtain on said array sensor a series of reference spots corresponding to said individual points, so that each of said reference spots is related to specific one of the row indexes of said light receiving elements;

defining within said array sensor a series of detection ranges respectively for said individual reference spots in such a manner that each of said detection ranges includes corresponding one of said reference spots and extends over a limited number of said light receiving elements, said limited number being not more than the number of said light receiving elements in said repeating unit;

said second step comprising:

3) directing said first light beam onto a second point on a surface of the object disposed on the reference surface so that the reflected light from said second point on said object surface forms on said array sensor a second illumination spot;

detecting the row index of said light receiving element corresponding to the second illumination spot and defining thus detected row index as a detected spot which falls within the detection range corresponding to said reference spot obtained by said first light beam;

5) analyzing a positional deviation between said detected spot within the detection range and said reference spot obtained with respect to said first light beam to determine a position of the second point of said object surface relative to the reference surface; and repeating the above proceedings 3), 4) and 5) with respect to individual points formed by scanning the light beam onto said object surface to obtain a series of positions of the individual points on said object surface relative to the reference surface for determination of the three-dimensional profile of the object surface.

3. A method as set forth in claim 1 or 2, wherein said detection range is capable of being shifted in opposite directions along the row of said array sensor depending upon a surface configuration of said object surface intended to be scanned, while keeping the corresponding reference spot in said detection range.

4. A method as set forth in claim 1 or 2, further utilizing a shutter for shielding said light receiving elements other than said detection range intended to receive said reflected light beam from said object surface.

5. A method as set forth in claim 1, wherein said array sensors are arranged in plural rows in such a manner as to obtain a series of illumination spots spaced along the row of each array sensor when scanning the light beam in two mutually crossing directions over the target surface.

6. A method as set forth in claim 1, wherein a plurality array sensors are arranged in rows in such a manner as to obtain a series of illumination spots which are spaced along the row and are produced in the form of a slit straddling over the adjacent rows when scanning said light beam across the target surface.

7. A method as set forth in claim 5 or 6, wherein the light receiving elements designated by the same row index but belong to the different rows of said array sensors are commonly coupled to provide a single output indicative of the same row index.

8. A method as set forth in claim 5 or 6, wherein said plural array sensors are configured such that the light receiving elements which are designated by the same row index but belong to the different array sensors are coupled separately to provide different column outputs indicative of column positions of array sensors.

9. A method as set forth in claim 5 or 6, wherein said plural array sensors are divided into plural column groups each including a limited number of said array sensors, the light receiving elements in each of said column groups being assigned to different column indexes which are common among the plural column groups, said light receiving elements having the same column index being collectively coupled to provide a single column output indicative of a column position of the array within the column group, said column index being cooperative with said row index to locate the light receiving element in row and column within one of the column groups of the array sensors.

10. A method as set forth in claim 6, further utilizing a shutter for shielding said light receiving elements other than said array sensor including said detection range intended to receive said reflected light beam from said object surface.

11. A method as set forth in claim 1 or 2, wherein said light beam is scanned onto the target surface in such a manner that a direction of said light beam on a scanned point of the target surface is in parallel with that of said light beam on the next scanned point.

12. A device for determination of a three-dimensional profile of an object, said device comprising:

a scanner for scanning a light beam across a target surface;

an array sensor spaced by a distance from said scanner for receiving the reflected light beam from said target surface through focusing lens means, said array sensor comprising a plurality of light receiving elements arranged in a row extending in the direction of following the reflected light beam, said light receiving elements being divided into a plurality of repeating units consisting of the same number of said light receiving elements, said light receiving elements in each of said repeating units being assigned respectively to different row indexes, said light receiving elements having the same row index being commonly coupled so as to provide a single row output indicative of the same row index when the reflected light beam hits any one of the light receiving elements having the same row index;

reference spot memory for storing a series of the row indexes obtained by a first step which comprises:
 a1) directing a first light beam from said light source onto a first point on a reference surface so that the reflected light beam from said first point forms on said array sensor a first illumination spot;
 a2) detecting the row index of said light receiving element corresponding to the first illumination spot and defining thus detected row index as a reference spot;
 a3) repeating the above proceedings a1) and a2) with respect to individual points formed by scanning the light beam onto the reference surface to obtain on said array sensor a series of reference spots corresponding to said individual points, so that each of said reference spots is related to specific one of the row indexes of said light receiving elements;

detection range setting means for defining within said array sensor a series of detection ranges respectively for said individual reference spots in such a manner that each of said detection ranges includes corresponding one of said reference spots and extends over a limited number of said light receiving elements, said limited number being not more than the number of said light receiving elements in said repeating unit;

detected spot collecting means for obtaining a series of the row indexes by a second step which comprises:
 b1) directing said first light beam onto a second point on a surface of the object on the reference surface so that the reflected light from said second point on said object surface forms on said array sensor a second illumination spot;
 b2) detecting the row index of said light receiving element corresponding to the second illumination spot which falls within the detection range corresponding to said reference spot obtained by said first light beam; and
 b3) repeating the above proceedings b1) and b2) with respect to individual points on said object surface by scanning the light beam to obtain on said array sensor a series of detection spots corresponding to said individual points, so that each of said detection spots is related to specific one of the row indexes of said light receiving elements;

analyzing means for determining a positional deviation between said detected spot and said reference spot based upon said row indexes obtained therefor within each of said detection ranges and for converting said deviation into a distance by which each of the scanned points on said object surface is spaced from said reference surface, therein providing the three-dimensional profile of the object surface.

13. A device as set forth in claim 12, wherein said array sensor is configured to have said light receiving elements elongated in a perpendicular direction to the row direction in which said light receiving elements are arranged in order to cover a wide scan range within which said illumination spot moves in said perpendicular direction.

14. A device as set forth in claim 12, wherein said focusing lens is a cylindrical lens having a convex which is curved along the direction of the array sensor in which said light receiving element are arranged.

15. A device as set forth in claim 12, further including a mirror disposed forwardly of said array sensor, and deflector means for deflecting said mirror in synchronism with the scanning of the light beam across the object surface in order to direct the reflected light beam to the array sensor while scanning the light beam across said object surface over a wide scan range.

16. A device as set forth in claim 12, wherein said focusing lens is disposed to have its optical axis perpendicular to the reference surface and wherein the number (M) of said repeating units is determined by the following equation:

$$M = m \cdot L / n \cdot R$$

wherein m is a magnification of the focusing lens; L is a length of a field of view intended to be inspected; n is the number of the light receiving elements in one unit; and R is a pitch of the light receiving elements.

* * * * *